United States Patent
Hanson et al.

(10) Patent No.: US 10,820,251 B2
(45) Date of Patent: Oct. 27, 2020

(54) RADIO COMMUNICATION SYSTEMS WITH INTEGRATED LOCATION-BASED MEASUREMENTS FOR DIAGNOSTICS AND PERFORMANCE OPTIMIZATION

(71) Applicant: CommScope Technologies LLC, Hickory, NC (US)

(72) Inventors: Van E. Hanson, Forest, VA (US); Thomas Kummetz, Kissing (DE)

(73) Assignee: CommScope Technologies LLC, Hickory, NC (US)

( * ) Notice: Subject to any disclaimer, the term of this patent is extended or adjusted under 35 U.S.C. 154(b) by 32 days.

(21) Appl. No.: 16/017,341

(22) Filed: Jun. 25, 2018

(65) Prior Publication Data

US 2018/0310225 A1 Oct. 25, 2018

Related U.S. Application Data

(63) Continuation of application No. 15/287,507, filed on Oct. 6, 2016, now Pat. No. 10,009,827, which is a
(Continued)

(51) Int. Cl.
*H04W 40/22* (2009.01)
*H04B 7/26* (2006.01)
(Continued)

(52) U.S. Cl.
CPC ........ *H04W 40/22* (2013.01); *H04B 7/15528* (2013.01); *H04B 7/15535* (2013.01);
(Continued)

(58) Field of Classification Search
CPC ............ H04B 7/15528; H04B 7/15535; H04B 7/2606; H04W 4/022; H04W 16/26; H04W 24/02; H04W 24/08; H04W 40/22
See application file for complete search history.

(56) References Cited

U.S. PATENT DOCUMENTS 3,628,147 A 12/1971 Kenichi
6,408,180 B1 6/2002 Mckenna et al.
(Continued)

FOREIGN PATENT DOCUMENTS

CN 1518370 A 8/2004
CN 1947355 A 4/2007
(Continued)

OTHER PUBLICATIONS

State Intellectual Property Office of the People's Republic of China, "Notice of Granting Patent Right for Invention from CN Application No. 201610330598.X", from Foreign Counterpart to U.S. Appl. No. 12/888,271, dated Dec. 6, 2019, pp. 1-6, Published: CN.
(Continued)

*Primary Examiner* — Chi H Pham
*Assistant Examiner* — Weibin Huang
(74) *Attorney, Agent, or Firm* — Fogg & Powers LLC

(57) ABSTRACT

A mobile communication system includes: a first antenna for receiving communication signals; processing circuitry for processing received communication signals; a second antenna for transmitting processed signals. The processing circuitry utilizes at least one configurable setting for processing received communication signals, the configurable setting being adaptable for varying the processing of received communication signals as the system moves through a mobile environment. The processing circuitry configured to: receive, over time, input representing current geographical location of the system; determine whether the system is entering a first geographical zone based on the input representing the current geographical location and path of system; and automatically adapt the configurable setting as the system enters the first geographical zone, wherein adaptation of configurable setting is based on known signal
(Continued)

characteristics associated with the received signals from mobile devices in the first geographical zone.

15 Claims, 14 Drawing Sheets

Related U.S. Application Data continuation of application No. 14/499,335, filed on Sep. 29, 2014, now Pat. No. 9,467,877, which is a continuation of application No. 12/888,271, filed on Sep. 22, 2010, now Pat. No. 8,849,190, which is a continuation-in-part of application No. 12/427,347, filed on Apr. 21, 2009, now Pat. No. 9,793,982.

(51) Int. Cl.
  *H04W 24/08* (2009.01)
  *H04B 7/155* (2006.01)
  *H04W 16/26* (2009.01)
  *H04W 24/02* (2009.01)
  *H04W 4/021* (2018.01)
  *H04W 88/08* (2009.01)

(52) U.S. Cl.
  CPC .......... *H04B 7/2606* (2013.01); *H04W 4/022* (2013.01); *H04W 16/26* (2013.01); *H04W 24/02* (2013.01); *H04W 24/08* (2013.01); *H04W 88/08* (2013.01)

(56) References Cited

U.S. PATENT DOCUMENTS

| | | | |
|---|---|---|---|
| 6,459,881 B1 | 10/2002 | Hoder et al. | |
| 6,487,393 B1 | 11/2002 | Davenport et al. | |
| 6,490,460 B1 | 12/2002 | Soliman | |
| 6,571,284 B1 | 5/2003 | Suonvieri | |
| 6,642,894 B1 | 11/2003 | Gross et al. | |
| 6,750,813 B2 | 6/2004 | Vargas-Hurlston et al. | |
| 6,785,511 B1 | 8/2004 | Hengeveld et al. | |
| 6,785,551 B1 | 8/2004 | Richard | |
| 6,792,262 B2 | 9/2004 | Yamanaka et al. | |
| 6,795,699 B1 | 9/2004 | Mccraw et al. | |
| 6,904,280 B2 | 6/2005 | Siegel | |
| 6,934,511 B1 | 8/2005 | Lovinggood et al. | |
| 6,952,158 B2 | 10/2005 | Kennedy, Jr. | |
| 7,016,688 B2 | 3/2006 | Simic et al. | |
| 7,020,701 B1 | 3/2006 | Gelvin et al. | |
| 7,027,919 B2 | 4/2006 | Bernesi et al. | |
| 7,102,568 B1 | 9/2006 | Newman et al. | |
| 7,206,294 B2 | 4/2007 | Garahi et al. | |
| 7,302,259 B2 | 11/2007 | Hwang | |
| 7,383,043 B2 | 6/2008 | Lee | |
| 7,383,049 B2 | 6/2008 | Deloach et al. | |
| 7,457,584 B2 | 11/2008 | Baker et al. | |
| 7,466,975 B2 | 12/2008 | Feher | |
| 7,522,918 B2 | 4/2009 | Wachter et al. | |
| 7,574,217 B1 | 8/2009 | Leung et al. | |
| 7,580,381 B2 | 8/2009 | Michelon et al. | |
| 7,583,940 B2 | 9/2009 | Matsuura et al. | |
| 7,593,688 B2 | 9/2009 | Pratt et al. | |
| 7,610,050 B2 | 10/2009 | Sayers et al. | |
| 7,626,960 B2 | 12/2009 | Muller | |
| 7,738,836 B2 | 6/2010 | Alles et al. | |
| 7,742,448 B2 | 6/2010 | Ramachandran et al. | |
| 7,831,263 B2 | 11/2010 | Sheynblat et al. | |
| 7,860,516 B2 * | 12/2010 | Hodges | H04W 4/029 455/456.1 |
| 8,121,535 B2 | 2/2012 | Proctor, Jr. et al. | |
| 8,577,283 B2 * | 11/2013 | Dean | H04B 7/15557 370/226 |
| 8,688,032 B2 * | 4/2014 | Kim | H04B 7/1555 455/11.1 |
| 8,699,943 B2 | 4/2014 | Kummetz et al. | |
| 8,849,190 B2 * | 9/2014 | Hanson | H04B 7/2606 455/11.1 |
| 9,467,877 B2 * | 10/2016 | Hanson | H04B 7/15535 |
| 10,009,827 B2 | 6/2018 | Hanson et al. | |
| 2001/0041568 A1 | 11/2001 | Hughes et al. | |
| 2002/0045461 A1 | 4/2002 | Bongfeldt | |
| 2002/0077144 A1 * | 6/2002 | Keller | H04W 4/029 455/550.1 |
| 2003/0109264 A1 | 6/2003 | Syrjarinne et al. | |
| 2003/0157943 A1 | 8/2003 | Sabat, Jr. | |
| 2004/0017310 A1 | 1/2004 | Vargas-Hurlston et al. | |
| 2004/0152462 A1 | 8/2004 | Hwang | |
| 2004/0219876 A1 * | 11/2004 | Baker | H04B 7/15535 455/7 |
| 2005/0101259 A1 | 5/2005 | Tong et al. | |
| 2005/0130588 A1 | 6/2005 | Pratt et al. | |
| 2005/0237329 A1 | 10/2005 | Rubinstein et al. | |
| 2006/0287824 A1 | 12/2006 | Lin | |
| 2007/0015462 A1 | 1/2007 | Dean et al. | |
| 2007/0087695 A1 | 4/2007 | Cohen et al. | |
| 2007/0129032 A1 | 6/2007 | Matsuura et al. | |
| 2007/0178832 A1 | 8/2007 | Gavrilovich | |
| 2008/0107076 A1 | 5/2008 | Ramachandran et al. | |
| 2008/0181174 A1 | 7/2008 | Cho | |
| 2008/0311848 A1 | 12/2008 | Proctor, Jr. et al. | |
| 2009/0023458 A1 | 1/2009 | Mountney | |
| 2009/0186632 A1 | 7/2009 | Kennedy, Jr. et al. | |
| 2009/0191881 A1 | 7/2009 | Shibata | |
| 2009/0304046 A1 | 12/2009 | Nadler et al. | |
| 2010/0081458 A1 | 4/2010 | Sheynblat et al. | |
| 2010/0118805 A1 * | 5/2010 | Ishii | H04W 52/283 370/329 |
| 2010/0120413 A1 | 5/2010 | Kennedy, Jr. et al. | |
| 2010/0171654 A1 | 7/2010 | Millard et al. | |
| 2010/0204856 A1 | 8/2010 | Smith et al. | |
| 2010/0265848 A1 | 10/2010 | Kummetz et al. | |
| 2010/0297397 A1 | 11/2010 | Chen | |
| 2011/0009056 A1 | 1/2011 | Hanson et al. | |

FOREIGN PATENT DOCUMENTS

| | | |
|---|---|---|
| CN | 101124732 A | 2/2008 |
| CN | 101304488 A | 11/2008 |
| CN | 101369982 A | 2/2009 |
| CN | 101632241 A | 1/2010 |
| CN | 101836478 A | 9/2010 |
| DE | 19950641 A1 | 5/2001 |
| DE | 60317345 | 8/2008 |
| EP | 0946007 A2 | 9/1999 |
| EP | 0976879 A1 | 2/2000 |
| EP | 1202472 A2 | 5/2002 |
| EP | 1282327 A2 | 2/2003 |
| EP | 1202471 B1 | 11/2003 |
| EP | 1274268 A3 | 6/2006 |
| EP | 1560451 A3 | 5/2007 |
| EP | 1202472 B1 | 1/2011 |
| EP | 2422459 A1 | 2/2012 |
| EP | 2434658 A2 | 3/2012 |
| GB | 2426665 A | 11/2006 |
| GB | 2426665 B | 12/2009 |
| JP | 2005102250 | 4/2005 |
| JP | 2008017264 A | 1/2008 |
| JP | 2011019066 A | 1/2011 |
| KR | 20050059392 A | 6/2005 |
| SE | 519389 C2 | 2/2003 |
| WO | 9828862 A2 | 7/1998 |
| WO | 1999022079 A1 | 5/1999 |
| WO | 2008040972 A1 | 4/2008 |
| WO | 2008069438 A1 | 6/2008 |
| WO | 2008144765 A2 | 11/2008 |
| WO | 2009061136 A2 | 5/2009 |

(56) References Cited

FOREIGN PATENT DOCUMENTS

WO            2010007840 A1     1/2010
WO            2010123645 A1    10/2010

OTHER PUBLICATIONS

German Patent and Trademark Office, "Interim Office Action in the utility model cancellation matter 20 2011 110 994", from Foreign counterpart to U.S. Appl. No. 12/888,271, dated Mar. 5, 2020, pp. 1-58, Published: DE.
European Patent and Trademark Office, "Extended European Patent Office from EP Application No. 11182359.7 dated Jul. 14, 2017", from Foreign Counterpart to U.S. Appl. No. 12/888,271, filed Jul. 14, 2017, pp. 1-10, Published: Germany.
European Patent Office, "Partial European Search Report from EP Application No. 11182359.7 dated Apr. 12, 2017", from Foreign Counterpart to U.S. Appl. No. 12/888,271, filed Apr. 12, 2017, pp. 1-7, Published: EP.
German Patent and Trademark Office, "Annex AG1 from Request for Cancellation of German Utility Model DE 20 2011 110 994 U1".
German Patent and Trademark Office, "Annex AG2 from Request for Cancellation of German Utility Model DE 20 2011 110 994 U1".
German Patent and Trademark Office, "Annex AG3 from Request for Cancellation of German Utility Model DE 20 2011 110 994 U1".
German Patent and Trademark Office, "Exhibit AS1 from Request for Cancellation of German Utility Model DE 20 2011 110 994 U1".
German Patent and Trademark Office, "Exhibit AS10 from Request for Cancellation of German Utility Model DE 20 2011 110 994 U1".
German Patent and Trademark Office, "Exhibit AS2 from Request for Cancellation of German Utility Model DE 20 2011 110 994 U1".
German Patent and Trademark Office, "Exhibit AS3 from Request for Cancellation of German Utility Model DE 20 2011 110 994 U1".
German Patent and Trademark Office, "Exhibit AS4 from Request for Cancellation of German Utility Model DE 20 2011 110 994 U1".
German Patent and Trademark Office, "Exhibit AS5 from Request for Cancellation of German Utility Model DE 20 2011 110 994 U1".
German Patent and Trademark Office, "Exhibit AS6 from Request for Cancellation of German Utility Model DE 20 2011 110 994 U1".
German Patent and Trademark Office, "Exhibit AS7 from Request for Cancellation of German Utility Model DE 20 2011 110 994 U1".
German Patent and Trademark Office, "Exhibit AS8 from Request for Cancellation of German Utility Model DE 20 2011 110 994 U1".
German Patent and Trademark Office, "Exhibit AS9 from Request for Cancellation of German Utility Model DE 20 2011 110 994 U1".
German Patent and Trademark Office, "Request for Cancellation of German Utility Model DE 20 2011 110 994 U1 dated Sep. 14, 2018", from Foreign Counterpart to U.S. Appl. No. 12/888,271, pp. 1-151, Published: DE.
German Patent and Trademark Office, "Response to Request for Cancellation of German Utility Model DE 20 2011 110 994 U1 dated Feb. 28, 2019", from Foreign Counterpart to U.S. Appl. No. 12/888,271, pp. 1-73, Published: DE.
PRC State Intellectual Property Office, "Notice of Granting Patent Right for Invention from CN Application No. 201110291034.7 dated Mar. 3, 2016" from Foreign Counterpart to U.S. Appl. No. 12/888,271, Mar. 3, 2016, pp. 1-6, Published: CN.
PRC State Intellectual Property Office, "First Office Action from CN Application No. 2011102914034.7 dated Jun. 23, 2015", from Foreign Counterpart to U.S. Appl. No. 12/888,271, pp. 1-8, Published: CN.
PRC State Intellectual Property Office, "First Office Action from CN Application No. 201610330598.X dated Dec. 29, 2018", from Foreign Counterpart to U.S. Appl. No. 12/888,271, pp. 1-27, Published: CN.
U.S. Patent and Trademark Office, "Final Office Action", U.S. Appl. No. 14/499,335, dated Jan. 25, 2016, pp. 1-8, Published: US.
U.S. Patent and Trademark Office, "Notice of Allowance", U.S. Appl. No. 12/888,271, dated May 21, 2014, pp. 1-9, Published: US.
U.S. Patent and Trademark Office, "Notice of Allowance", U.S. Appl. No. 14/499,335, dated Jun. 8, 2016, pp. 1-13, Published: US.
U.S. Patent and Trademark Office, "Notice of Allowance", U.S. Appl. No. 15/287,507, dated Feb. 14, 2018, pp. 1-13, Published: US.
U.S. Patent and Trademark Office, "Office Action", U.S. Appl. No. 12/888,271, dated Dec. 5, 2013, pp. 1-20, Published: US.
U.S. Patent and Trademark Office, "Office Action", U.S. Appl. No. 14/499,335, dated May 1, 2015, pp. 1-15, Published: US.
U.S. Patent and Trademark Office, "Office Action", U.S. Appl. No. 15/287,507, dated Jul. 13, 2017, pp. 1-34, Published: US.
U.S. Patent and Trademark Office, "Restriction Requirement", U.S. Appl. No. 12/888,271, dated Jul. 5, 2013, pp. 1-7, Published: US.
U.S. Patent and Trademark Office, "Restriction Requirement", U.S. Appl. No. 14/499,335, dated Feb. 4, 2015, pp. 1-7, Published: US.
PRC State Intellectual Property Office, P.R. China, "Second Office Action from CN Application No. 201610330598.X dated Sep. 13, 2019", from Foreign Counterpart to U.S. Appl. No. 12/888,271, pp. 1-25, Published: CN.
European Patent Office, "Communication under Rule 71(3) EPC from EP Application No. 11182359.7", from Foreign Counterpart to U.S. Appl. No. 12/888,271, dated Aug. 19, 2019, pp. 1-81, Published: EP.
German Patent and Trademark Office, "Response to Opposition Grounds by Respondent for Request for Cancellation of German Utility Model DE 20 2011 110 994 U1", from Foreign Counterpart to U.S. Appl. No. 12/888,271, filed Sep. 6, 2019, pp. 1-27, Published: DE.
European Patent Office, "Partial European Search Report from EP Application No. 20155690.9", from Foreign Counterpart to U.S. Appl. No. 12/888,271, dated Mar. 6, 2020, pp. 1-15, Published: EP.
European Patent Office, "Extended European Search Report from EP Application No. 20155690.9", from Foreign Counterpart to U.S. Appl. No. 12/888,271, dated Jul. 7, 2020, pp. 1 through 14, Published: EP.

* cited by examiner

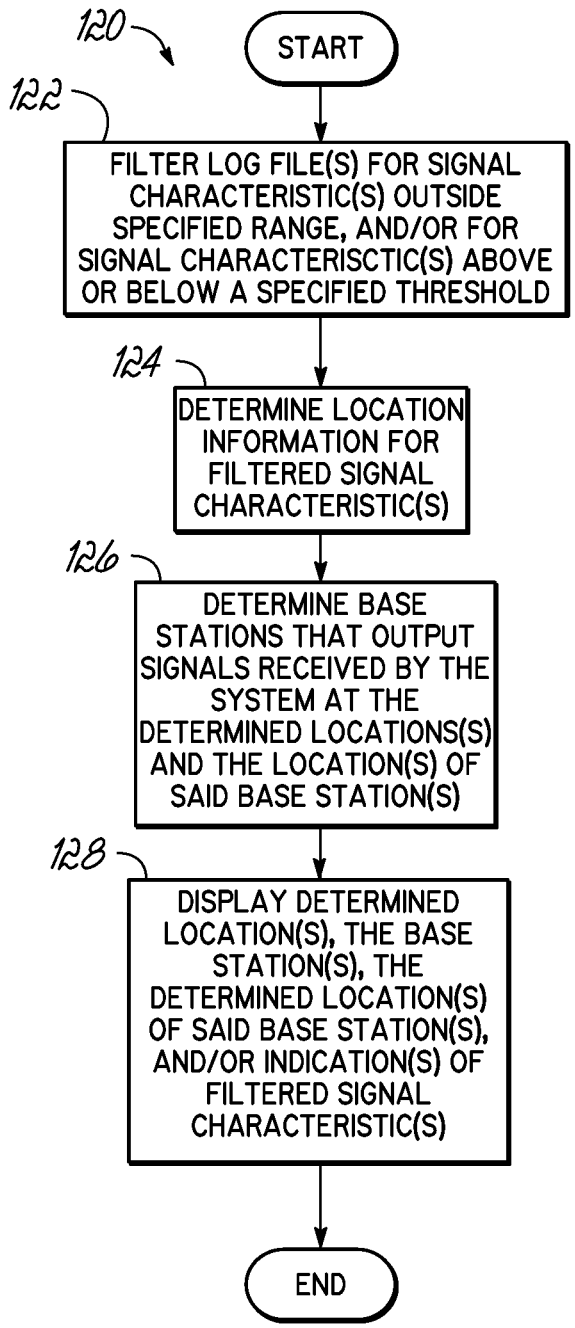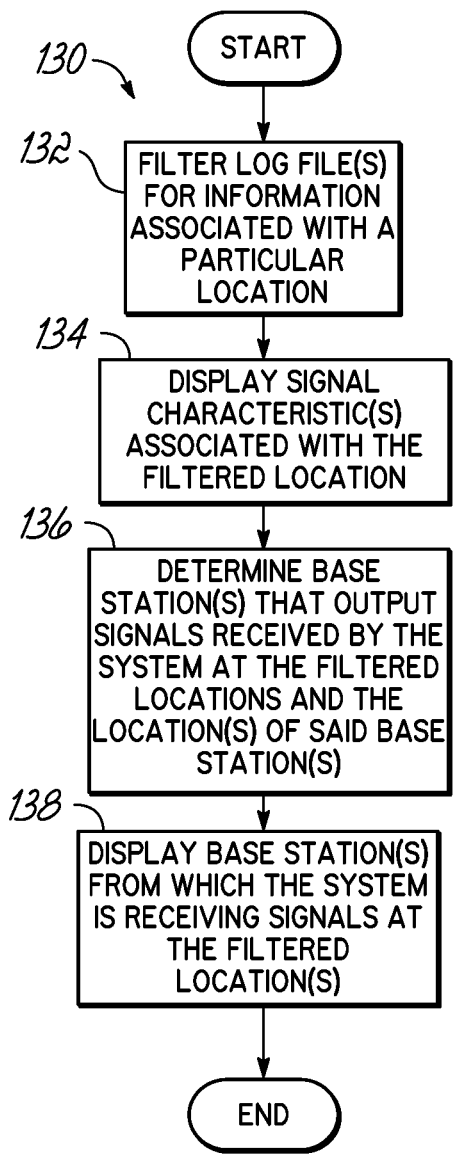
FIG. 5
FIG. 6

SAMPLE TRACE LOGS

GPS TRACE:

| TIME | UTC | LATITUDE | LONGITUDE | ALTITUDE | SPEED | DIRECTION | VIEW | FIX | HDoP |
|---|---|---|---|---|---|---|---|---|---|
| 14:01:53 | 175920.9 | 37.3733406 | -79.1730881 | 211.5 | 87.7800 | 24.4 | 5 | 11 | 1.9 |
| 14:01:54 | 175921.9 | 37.3735428 | -79.1729813 | 210.0 | 86.6700 | 22.0 | 5 | 11 | 1.9 |
| 14:01:55 | 175923.0 | 37.3737450 | -79.1728821 | 207.0 | 86.4900 | 20.5 | 5 | 11 | 1.8 |
| 14:01:56 | 175924.0 | 37.7379471 | -79.1727905 | 206.0 | 86.4900 | 19.0 | 5 | 11 | 1.8 |

RF TRACE:

| MESSAGE | TIME | MODULE | FRAME | FRAME SEQ | TRC COUNT | GROUP | GAIN | Pk RSSI dBfs | Pk RSSI dBm | PRED RSSI dBfs | PRED RSSI dBm | AVG RSSI dBfs | AVG RSSI dBm |
|---|---|---|---|---|---|---|---|---|---|---|---|---|---|
| 6 | 14:01:53 | 0 | 88357 | 17 | 0 | 1 | 70.1 | -26.1 | -47.2 | -30.4 | -51.6 | -27.7 | -44.9 |
| 6 | 14:01:53 | 0 | 88357 | 17 | 0 | 2 | 65.7 | -18.8 | -39.9 | -18.5 | -39.8 | -18.8 | -39.9 |
| 6 | 14:01:53 | 0 | 88357 | 17 | 0 | 3 | 71.9 | -22.7 | -43.5 | -23.5 | -44.3 | -22.3 | -43.1 |
| 6 | 14:01:53 | 1 | 88497 | 24 | 0 | 1 | 59.2 | -11.6 | -27.9 | -12.0 | -28.3 | -10.6 | -26.9 |

FIG. 12

RADIO COMMUNICATION SYSTEMS WITH INTEGRATED LOCATION-BASED MEASUREMENTS FOR DIAGNOSTICS AND PERFORMANCE OPTIMIZATION

CROSS-REFERENCE TO RELATED APPLICATIONS

This Application is a continuation application of U.S. patent application Ser. No. 15/287,507, filed Oct. 6, 2016, and entitled "RADIO COMMUNICATION SYSTEMS WITH INTEGRATED LOCATION-BASED MEASUREMENTS FOR DIAGNOSTICS AND PERFORMANCE OPTIMIZATION," which is a continuation of U.S. patent application Ser. No. 14/499,335, filed Sep. 29, 2014, and entitled "RADIO COMMUNICATION SYSTEMS WITH INTEGRATED LOCATION-BASED MEASUREMENTS FOR DIAGNOSTICS AND PERFORMANCE OPTIMIZATION," which is a continuation of U.S. patent application Ser. No. 12/888,271, filed Sep. 22, 2010, and entitled "RADIO COMMUNICATION SYSTEMS WITH INTEGRATED LOCATION-BASED MEASUREMENTS FOR DIAGNOSTICS AND PERFORMANCE OPTIMIZATION," which application is a continuation-in part application of U.S. patent application Ser. No. 12/427,347, filed Apr. 21, 2009, and entitled "System for Automatic Configuration of a Mobile Communication System," the contents of each of which are hereby incorporated by reference.

FIELD OF THE INVENTION

The present invention relates to radio communication systems, such as repeaters and distributed antenna systems generally as well as, more specifically, to communication systems for mobile radios that operate in a mobile environment having changing conditions and changing locations.

BACKGROUND OF THE INVENTION

Repeaters, distributed antenna systems, and similar systems are communications systems that are used to extend wireless coverage into areas where the radio signals from base stations (BTS) are often very attenuated or absent. Those areas might be inside buildings, in tunnels, located in shadowed areas that are behind mountains or in underground train systems, as well as other isolated areas. Generally, applications for such communications systems involve installations where the repeater or distributed antenna system is immobile and is mounted in a permanent location. That is, it is a fixed installation.

In other applications, the area that has limited penetration of the RF signals is mobile. That is, the repeater or distributed antenna system is installed in a moving or mobile system such as a train, a ship, a car, a bus or an airplane. This application presents unique performance issues not encountered in fixed installations.

When a repeater or distributed antenna systems (DAS system) is used in a mobile application, the environment in which it is operating is constantly changing. As the repeater or DAS system moves through different areas, the wanted and unwanted signals processed by the repeater or DAS system change in level as it nears and then moves away from the sources of those signals. Additionally, the signals processed by the repeater or DAS system can change in frequency as the system passes in and out of the range of different signal sources. Repeaters and DAS systems used in these environments are designed to accommodate these changes, but certain combinations of signals at specific locations may cause a system to function poorly.

Another unique characteristic of mobile applications of repeaters or DAS systems is the rate at which its operating environment can change. In fixed installations, the environment is usually quite static and any changes can be accommodated through slow adaptation of the repeater or DAS system. However, in mobile installations the signal environment can be very dynamic, and the conditions that require modified operation may exist for only a short period of time. Therefore, a repeater or DAS system used in a mobile installation must adapt very rapidly if it needs to accommodate those changes. Typically, a repeater or DAS system adapts its operation in a reactive manner. In other words, it modifies its operation after it detects the conditions that require a change in its operation. Operating in a reactive manner in slowly changing environments is acceptable, but in rapidly changing mobile environments operating in a reactive manner can lead to poor performance because the condition may have come and gone before the system is able to react to the change and to modify its operation.

SUMMARY OF THE INVENTION

An integrated measurement and analysis system for radio repeaters and distributed antenna systems that utilizes location data and other information to enhance the diagnostic and optimization capabilities of repeaters and distributed antenna systems used in mobile installations is provided. The system includes a controller that continuously determines the current geographic location of the system from an input. The controller records the location of the system along with other measurements taken at that location. The resulting database of location-dependent measurements facilitates the diagnosis of location specific performance issues and improves the ability of the system to optimize its performance while in these different locations.

Embodiments of the invention integrate the measurement and analysis means along with location information to detect the presence of, and diagnose the source of, location-specific performance problems when repeaters or DAS systems are used in mobile applications. Embodiments of the invention improve the performance of a repeater or DAS system used in a mobile environment by implementing mechanisms to maintain a historical database of past operating conditions at different locations, thereby allowing the repeater or DAS system to anticipate the environmental conditions in a particular area prior to entering that area, enabling the repeater or DAS system to proactively adapt its operation as it enters that area instead of reactively waiting until after entering that area. In addition to storing the location-based historical information in a local database, it can also be transmitted to a central system that serves other mobile repeaters and/or DAS systems that will operate in the same areas, enabling those devices to anticipate the operating conditions in areas in which they have not already operated.

In one specific embodiment, a communication system is provided that includes at least one receive antenna for receiving communication signals and processing circuitry for processing the received communication signals. The system further comprises at least one transmit antenna for transmitting the processed signals. The processing circuitry utilizes at least one configurable setting in the processing of the received communication signals, each configurable setting being adaptable for varying the operation of the processing. The processing circuitry is operable to receive information regarding a current geographical location of the system and selectively adapt the at least one configurable setting of the system based upon the current location information.

In another specific embodiment, a communication system is provided that includes at least one receive antenna for receiving communication signals, processing circuitry for processing the received communication signals, and at least one transmit antenna for transmitting the processed signals. The processing circuitry is operable to log data associated with the received communication signals and the transmitted processed signals in at least one temporal log file, then continue the logging a predetermined amount of time after detecting a fault associated with the system. The processing circuitry is further operable to store the data in the at least one temporal log file into at least one log file in response to the detection of the fault.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 5 is a flowchart illustrating a sequence of operations to filter data for specific signal characteristics gathered by the adaptive mobile system of FIG. 1 and display information associated with that filtered data to a user;

FIG. 6 is a flowchart illustrating a sequence of operations to filter data for a specific location associated with the adaptive mobile system of FIG. 1 and display information associated with that filtered location;

FIG. 12 is a screenshot of a screen for a user to view information about locations detected by the adaptive mobile system of FIG. 1, as well as signal characteristics of signals associated with those locations;

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Hardware and Software Environment

Figure 1:
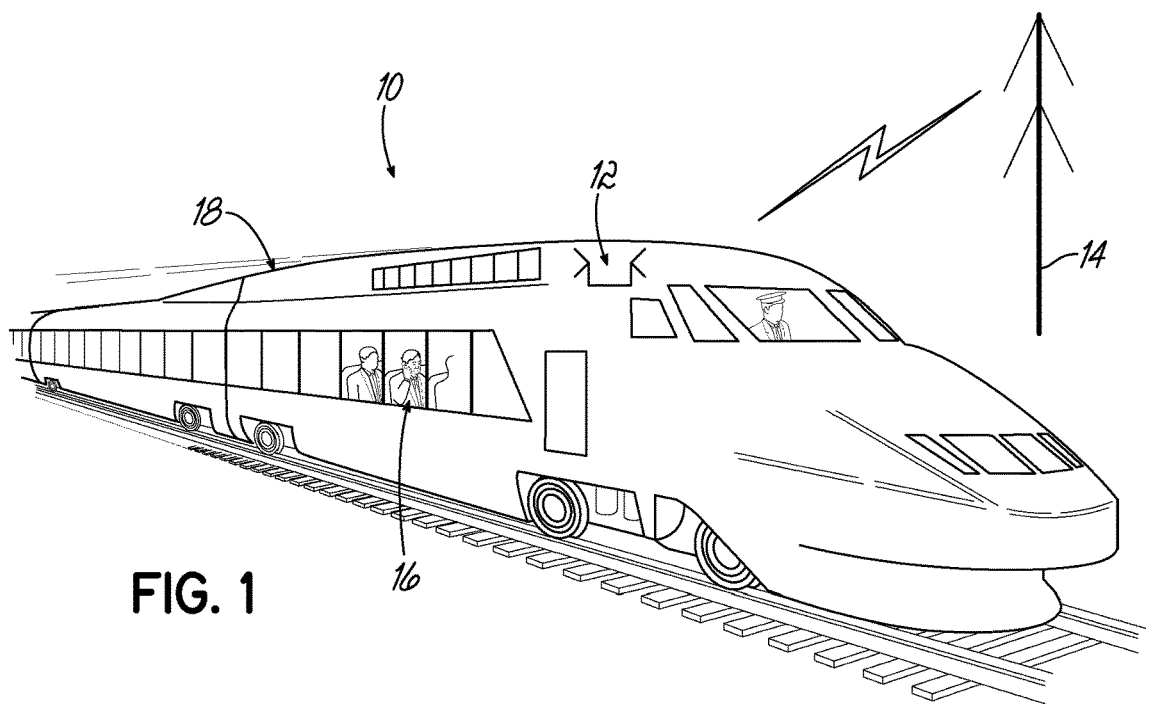
FIG. 1 illustrates a mobile communication system for use in a mobile environment having an adaptive mobile system consistent with embodiments of the invention.

Turning to the drawings, wherein like numbers denote like parts throughout the several views, FIG. 1 is an illustration of an exemplary mobile communication system 10 that includes at least one adaptive system 12 in a mobile installation, such as an adaptive mobile repeater or an adaptive mobile distributed antenna system, for example, to facilitate communication between one or more base stations 14 and one or more mobile devices 16 that are in use in a mobile platform or moving environment, such as a train 18 as illustrated in FIG. 1. Although the adaptive mobile system 12 is shown on a train 18, the adaptive mobile system 12

(hereinafter, "system" 12) may be disposed in any other appropriate mobile environment, such as in a plane, ship, or automotive vehicle.

Figure 2A:
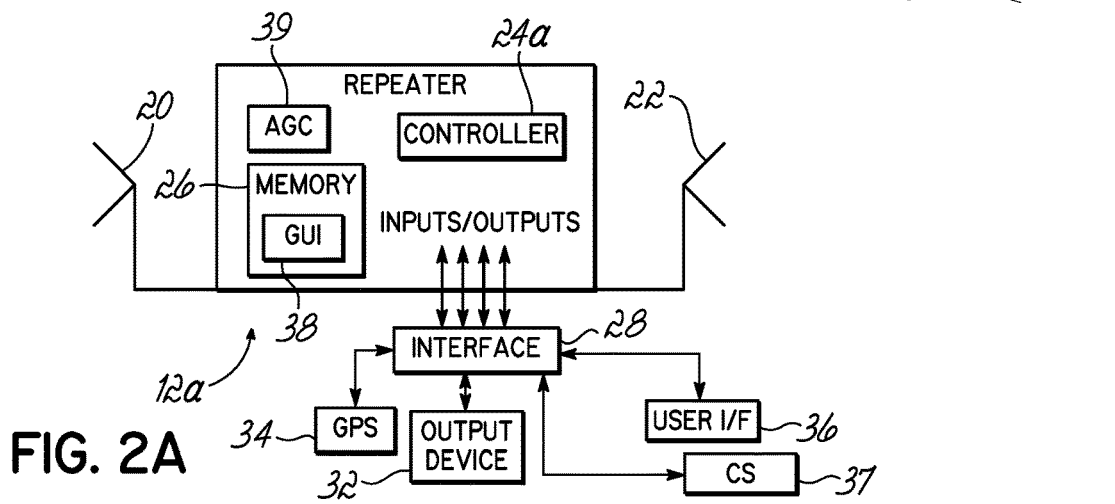
FIG. 2A is a diagram illustrating the components of one embodiment of an adaptive mobile system configured in the mobile communication system of FIG. 1.

FIG. 2A is a diagrammatic illustration of components of one embodiment of a system 12a (hereinafter, "repeater" 12a). The repeater 12a includes a donor antenna 20 that communicates (e.g., transmits, receives, and/or transceives signals) with one or more base stations 14. The repeater 12a further includes a coverage antenna 22 that communicates signals with one or more mobile devices 16 in the mobile environment (e.g., inside the compartments of train cars). The coverage antenna 22 consists of one or more antennas that are coupled through a signal splitter and/or combiner. Another form of the coverage antenna 22 is a leaky feeder cable as it is frequently used in confined areas such as tunnels, buildings, etc.

In some embodiments, the repeater 12a includes at least one controller 24a coupled to a memory 26. Each controller 24a is typically implemented in hardware using circuit logic disposed on one or more physical integrated circuit devices or chips. Each controller 24a may be one or more microprocessors, micro-controllers, field programmable gate arrays, or ASICs, while memory 26 may include random access memory (RAM), dynamic random access memory (DRAM), static random access memory (SRAM), flash memory, and/or another digital storage medium. Memory 26 is also typically implemented using circuit logic disposed on one or more physical integrated circuit devices, or chips. As such, memory 26 may be considered to include memory storage physically located elsewhere in the repeater 12a, e.g., any cache memory in the controller 24a, as well as any storage capacity used as a virtual memory, e.g., as stored on a mass storage device (not shown) coupled to the controller 24a.

The controller 24a, in some embodiments, is configured to capture and record information associated with either the repeater 12a and/or the at least one base station 14, and to use this information to maintain or selectively vary or adapt the settings of the repeater 12a. For example, and in response to the captured information, the controller 24a may adjust the power and/or attenuation of the signals received by the donor antenna 20 and/or coverage antenna 22. Moreover, and also in response to the captured information, the controller 24a may adjust a filter to amplify and/or attenuate the signals received and/or communicated by the donor antenna 20 and/or coverage antenna 22. In some embodiments, the controller 24a is further configured to store the captured information in the memory 26. Such information may include the power of signals received and/or communicated by the repeater 12a, the quality of signals received and/or communicated by the repeater 12a, the frequency of signals received and/or communicated by the repeater 12a, the signal types received and/or communicated by the repeater 12a, the particular networks the repeater 12a is communicating on, an identity of a base station 14 the repeater 12a is communicating with, the location of the base station 14 the repeater 12a is communicating with, the location of the repeater 12a when data is captured, the time that the information is captured, the usage of the repeater 12a (e.g., the number of mobile devices 16 currently utilizing the repeater 12a to communicate), and/or a identification of the repeater 12a (e.g., a serial number, a model number, a network identifier), as well as other mobile environment information, mobile network information, and/or other information. In alternative embodiments, the repeater 12a may not receive an indication of the location of a base station 14. Rather, the repeater 12a may self-determine the position of the base station 14 based on other captured information and/or a pre-configured indication of such a location.

In exemplary embodiments, the controller 24a communicates with at least one external device, peripheral device, and/or data source using at least one appropriate interface 28. In particular, the repeater 12a is configured to receive data through at least one user interface 36 (including, for example, a keyboard, mouse, scanner, and/or other user interface) and/or output data through at least one output device 32 (including, for example, at least one display, speakers, and/or another output device). Additionally and/or alternatively, the repeater 12a is configured to receive data from, and transmit data to, at least one computing system 37. In particular, the computing system 37 is configured to receive the output data from the repeater 12a and display it in a web-based interface, such as a web browser. Similarly, the computing system 37 is configured to accept user input in the web browser and provide that input data to the repeater 12a.

In some embodiments, the repeater 12a is configured to receive location data from at least one location identifying device, such as a global navigation satellite system receiver, and more particularly a GPS receiver device 34, as illustrated in FIG. 2A. In further specific embodiments, the repeater 12a is configured to receive data from additional measurement devices, such as clocks and/or speedometers, as well as temperature, humidity, altitude, and/or other measurement devices that may be associated with the mobile environment and/or an outdoor environment. As such, those measurement devices may also communicate with the repeater 12a through the interface 28. Although not illustrated, a network interface—such as for a local area network (e.g., a wired network) or short-area wireless network (e.g., an 802.xx standard wireless network)—or another peripheral interface (e.g., a USB interface) may be coupled to, or incorporated in, the at least one interface 28 (e.g., to communicate with the computing system 37). As such, information collected by the repeater 12a may be downloaded from the repeater 12a, or information uploaded to the repeater 12a. For example, and not intended to be limiting, such information may include repeater configuration data, a database that includes base station information and more specifically their location information, as well as other system 10 parameter, software, and firmware data.

As illustrated in FIG. 2A, the repeater 12a is configured to communicate with both a user interface 36 and an output device 32. In alternative embodiments, the repeater 12a is configured to receive and output data through a device that is operative as a user interface and output device in combination, such as a touch screen display (not shown). Also as illustrated in FIG. 2A, the repeater 12a is configured to communicate with a location determining device, such as the GPS receiver device 34. In alternative embodiments, the GPS receiver device 34, another global navigation satellite system receiver, or another location determining device, is incorporated within the repeater 12a and/or directly connects to the controller 24a.

In exemplary embodiments, the memory 26 of the repeater 12a is configured with program code to provide user interface components on the output device 32. As such, this graphical user interface ("GUI") program code 38 may allow for a user to input or output data to the repeater 12a, as well as allow the user to configure the settings of the repeater 12a (e.g., such as to instruct the system 12a to selectively gather information). It will be appreciated by one having ordinary skill in the art that the memory 26 may be configured with additional program code to implement embodiments of the invention.

In exemplary embodiments, the repeater 12a further includes at least one automatic gain control circuit 39 (illustrated as, and hereinafter, "AGC" 39), or at least one alternative signal characteristic modification circuit, to modify the power, modify the gain, filter, modulate, or otherwise adjust at least one signal characteristic of at least one received and/or transmitted signal. In this manner, the controller 24a is configured to dynamically change the configurable settings of the repeater 12a to react to current and/or future conditions.

Figure 2B:
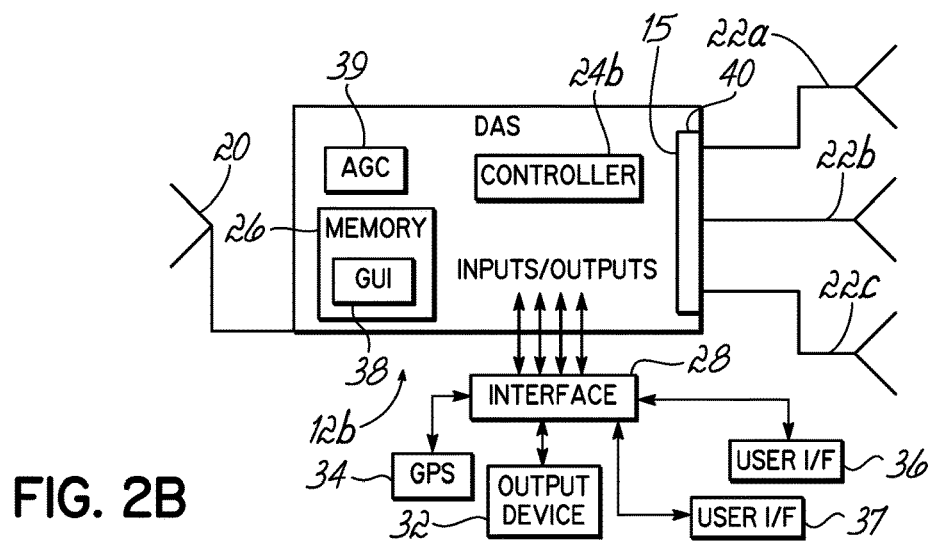
FIG. 2B is a diagram illustrating the components of an alternative embodiment of an adaptive mobile system configured in the mobile communication system of FIG. 1.

FIG. 2B is a diagrammatic illustration of components of an alternative embodiment of an adaptive mobile system 12b in the form of a distributed antenna system (hereinafter, "distributed system" 12b), wherein the distributed system 12b operates as a master unit, or hub, to communication with a plurality of remote coverage antennas or coverage antenna units 22a-22c. As illustrated in FIG. 2B, the distributed system 12b includes a controller 24b configured to control appropriate interface circuitry 40 for handling signals associated with the plurality of coverage antennas 22a-22c to operate the distributed system 12b as is known in the art. As such, controller 24b is only be configured to receive signals from base stations 14 on the donor antenna 20, process the signals, and transmit a plurality of signals on the plurality of coverage antennas 22a-22c, but the controller 24 is also configured to dynamically change the configurable settings of the distributed system 12b to react to current and/or future conditions.

Embodiments of the invention advantageously provide location information to all data and signal characteristics, enabling a user to determine the location of a system 12 (e.g., either a repeater 12a or a distributed system 12b) and to reference that location to determine faults, errors, and/or other information within the context of the location. Advantageously, as location determination functionality is integrated into the system 12, extra and/or after-market equipment does not need to be attached to the system 12, and the system 12 gathers the information as part of its normal logging routines.

Thus, embodiments of the invention utilize location information from a GPS receiver device 34 or other source of location information to tag all measurements with the location of the base station 14 and/or system 12 when the measurement or other type of data is recorded in one or more log files. Additionally, these measurements are time stamped, as is typically done with measurement data.

In some embodiments, the location data and the measurement data are stored in separate files. By maintaining a common time reference or synchronized time references, the location of the base station 14 or system 12 when each measurement was taken can be determined.

Data recorded by the system 12 may be utilized to generate plots, graphs, and other representations of the data by the repeater, or otherwise exported for analysis or display by the computing system 37. Specifically, when measurements are viewed by the user, the location information can be used to enhance the data visualization thereof. For example, the location of the base station 14 or the route of the system 12 can be displayed via a two dimensional representation, and the magnitude of measurement data can be reflected by changing the color of a line that represents that route. Alternatively, a three dimensional representation can be used, with the X and Y axes used for the latitude and longitude of the route, and the Z axis used for the magnitude of the measurement data. In that way, and in accordance with the invention, system performance may be monitored and analyzed and problems can be diagnosed and isolated. For example, if system performance degrades, the location information may be used to determine if the system 12 presents the problem or if an external base station 14 presents the problem, or both, for example.

For example, the information captured by the system 12 includes the system's geographical location. For diagnostic purposes, the system 12 also captures indications of the quality of signals received from the one or more base stations 14 (e.g., the power, the gain, the frequency, the number of signals, the carrier-to-interference ratio or "C/I", the error vector magnitude or "EVM", the modulation error ratio or "MER", the beacon type), the geographical location of the base station 14, the cell global identifier (or "CGI") of the base station 14, indications of the quality of signals sent to one or more mobile devices 16 (e.g., the power, the gain, the frequency, the number of signals, the carrier-to-interference ratio, the error vector magnitude, the modulation error ratio, the beacon type), indications of the quality of signals received from one or more mobile devices 16 (e.g., the power, the gain, the frequency, the number of signals, the carrier-to-interference ratio, the error vector magnitude, the modulation error ratio, the beacon type), indications of the quality of signals sent to the one or more base stations 14 (e.g., the power, the gain, the frequency, the number of signals, the carrier-to-interference ratio, the error vector magnitude, the modulation error ratio, the beacon type). In turn, the CGI of the base station may include the mobile country code (MCC), the mobile network code (MNC), and/or cell identifier (CI) associated with the base station 14). Furthermore, information regarding a group to which that system 12 is assigned is also captured. The speed of the mobile environment is also captured. Additionally, the system 12 may be configured to determine information associated with the environment inside and/or outside the mobile environment (e.g., including the temperature, humidity, and/or altitude thereof). Inasmuch as capturing a beacon type (e.g. GSM, CDMA, UMTS), or beacon protocol information (e.g., BCCH, MNC, MCC, CID, BCC, NCC), the system 12 may be configured to determine both the beacon types of signals it processes (e.g., signal types for which the system 12 is configured to receive and/or transmit) as well as the beacon types of signals it doesn't process (e.g., signal types for which the system 12 is not configured).

Figure 3:
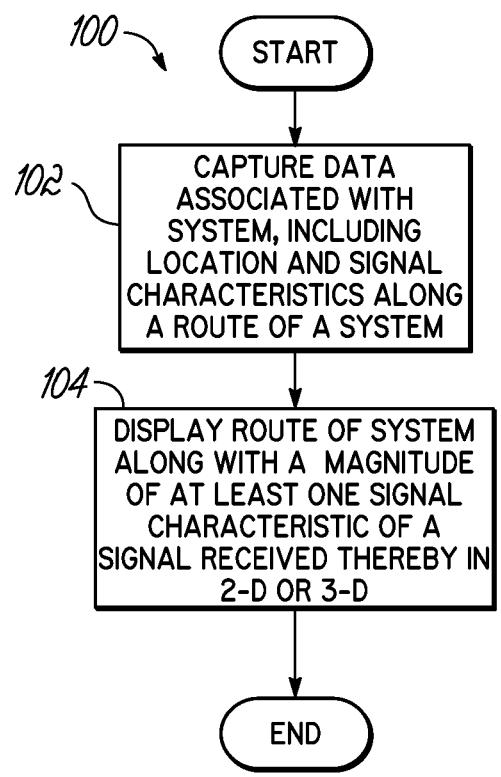
FIG. 3 is a flowchart illustrating a sequence of operations to capture signal characteristic data with the adaptive mobile system of FIG. 1, as well as display that signal characteristic data relative to location.

For example, FIG. 3 is a flowchart 100 illustrating a sequence of operations to display data associated with the system 12 along a route of the system 12. In particular, the sequence of operations of FIG. 3 may be used to display the magnitude of a signal characteristic of a signal received by the system 12, such as that signal's received power, along a route of the system 12. In some embodiments, the sequence of operations of FIG. 3 is executed by the system 12, and thus the system 12 is configured to generate a display of a signal characteristic along a route. In alternative embodiments, the sequence of operations of FIG. 3 is executed by a computing system 37 separate from the system 12, with that computing system being configured to generate the display. Thus, the system 12 captures data, including its location and signal characteristics along the route it travels (block 102). The system 12, or a separate computing system 37, then displays the route of the system 12 along with a magnitude of at least one signal characteristic of a signal received by the system 12 (block 104). In particular, the display may include a two dimensional representation of the route of the system 12 with the magnitude of the signal characteristic displayed as a color gradient along the route, or the display may include a three dimensional representation in which the X and Y axes are used for the latitude and longitude of the route, while the Z axis is utilized for the magnitude of the signal characteristic.

Figure 4:
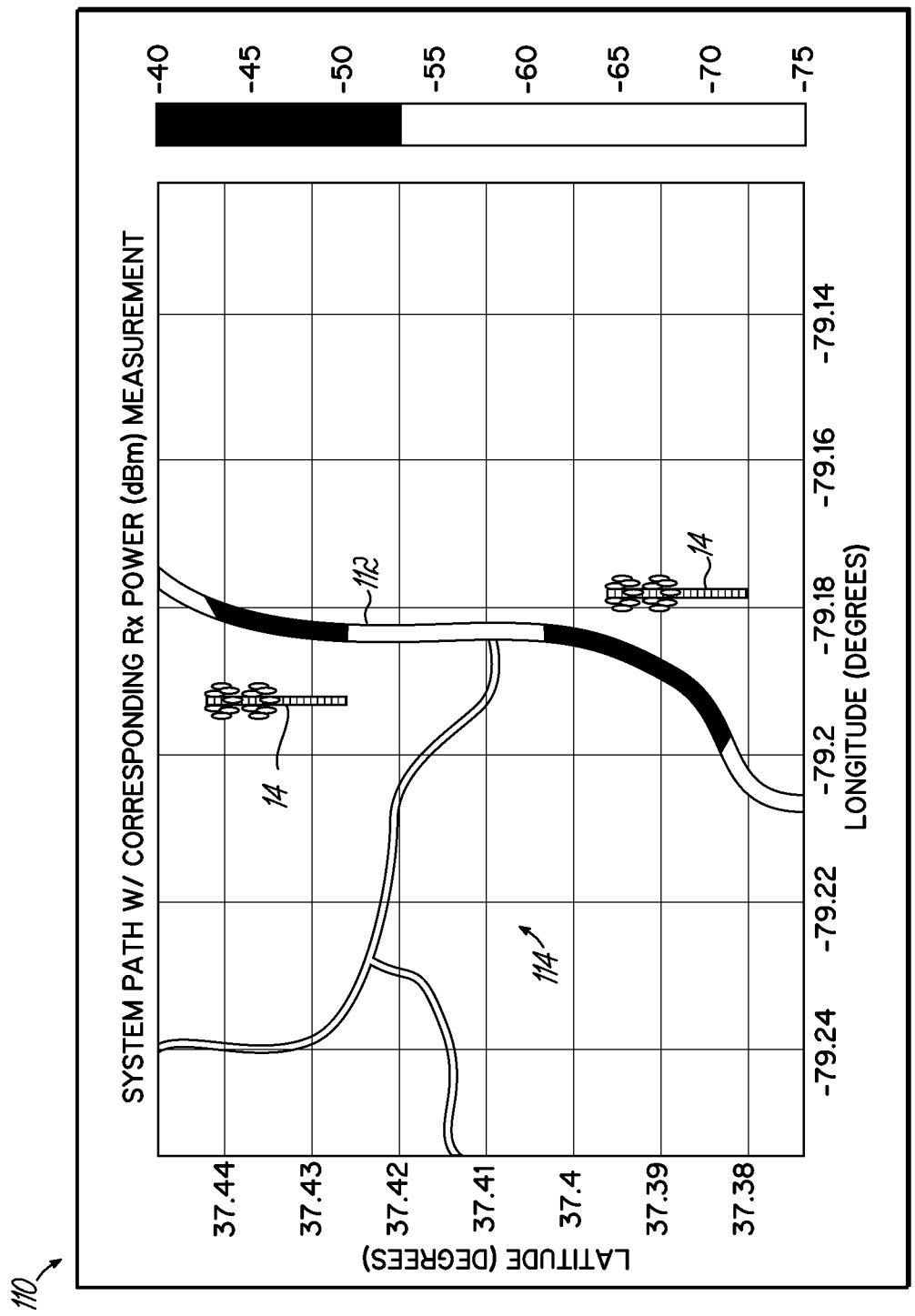
FIG. 4 is a screenshot of a screen for a user to view information about a signal characteristic of a signal captured by the adaptive mobile system of FIG. 1 in relation to location.

As such, FIG. 4 is an illustration of a power versus location screen 110 (hereinafter, a "PVL" screen 110) that may be generated consistent with embodiments of the invention. As illustrated in FIG. 4, the PVL screen 110 indicates the power of signals received by at least one system 12 in relation to a location, and in particular in relation to a route 112 of a train 18. Specifically, the PVL screen 110 illustrates a plurality of locations and the received power level of signals as detected by the at least one system 12 and displays the power level of signals as a color gradient on a two dimensional plot. In some embodiments, the PVL screen 110 is configured with an overlay or image 114, such as a satellite image, relief image, street image, map image, and/or another image (e.g., from the memory 26 or an online location, such as an online map service) to provide context for the user to view characteristics of signals in the context of a location. Furthermore, and as illustrated in FIG. 6, the PVL screen 110 may illustrate, in the image 114, the locations of one or more base stations 14 that may communicate with the at least one system 12.

In some embodiments, the PVL screen 110 may be interactable. For example, the PVL screen 110 may be configured with user interaction capture components to determine if a user clicks on a location, such as a location on the image 114, to display information associated with the selected location (e.g., the received power level at the selected location).

The availability of location information enhances the ability to determine areas where specific problems occur. For example, after capturing the data, a user may filter the data for signal characteristics outside a specified range and/or above or below a specified threshold. The location of these measurements can be included to allow the user to determine where the trouble occurs so they can modify a network to improve performance. FIG. 5 is a flowchart 120 illustrating a sequence of operations that can be executed by the system 12 or a separate computing system 37 to isolate locations at which signals received by the system 12 outside a specified range and/or above or below a specified threshold, as well as to determine the specific location information associated therewith, base stations associated therewith, and the locations of participating base stations. As such, the sequence of operations filters log data for at least one specified signal characteristic of a signal outside a specified range and/or above or below a specified threshold (block 122). For example, the filtering may include filtering log data associated with the power of received signals to determine which signals are outside a specified power range, filtering log data associated with the power of received signals to determine which signals are above or below a power threshold, and/or filtering log data associated with the gain applied to received signals to determine which signals are above and below a gain threshold. The sequence of operations then determines the location of the system 12 when it experienced the at least one signal characteristic that results from the applied filter (the at least one "filtered signal characteristic") (block 124). In this manner, the location of the mobile system 12 when it experienced that filtered signal characteristic is determined.

In some embodiments, the sequence of operations of FIG. 5 identifies at least one base station 14 that interfaces with the system 12 and outputs the signals received by the system 12 and associated with the at least one filtered signal characteristic, as well as the location of that at least one base station 14 (block 126). In this manner, a user can determine which base stations 14 are providing signals associated with the filtered signal characteristics as well as their respective locations. Thus, a display may be generated that indicates at least one filtered signal characteristic, a respective location of the at least one filtered signal characteristic, at least one base station 14 associated with at least one filtered signal characteristics, and/or a respective location associated with the at least one base station 14 (block 128).

Alternatively, when problems are identified at a certain location, the database can be filtered with the location of the area that reported the problems, and the measurements for this area can be examined to identify the source of problems. For example, FIG. 6 is a flowchart 130 illustrating a sequence of operations that can be executed by the system 12 or a separate computing system 37 to filter data for specific locations associated with the system 12 and display information associated with those specific filtered locations. Thus, log data can be filtered for information associated with a particular location (block 132) such that at least one signal characteristics associated with that filtered location is displayed (block 134). In addition, at least one base station 14 that transmits signals received by the system 12 at the filtered location, as well as the location of that base station 14, can be determined (block 136). Thus, the determined base stations 14, along with their determined locations, can be displayed (block 138).

Signals received by the system 12 can be decoded along with the location of the system 12 when the data is decoded. For example, a system 12 can decode the coordinates of the base station signals it receives and/or retransmits, along with other identification information to identify which base station signals are being repeated at any particular location.

Figure 7:
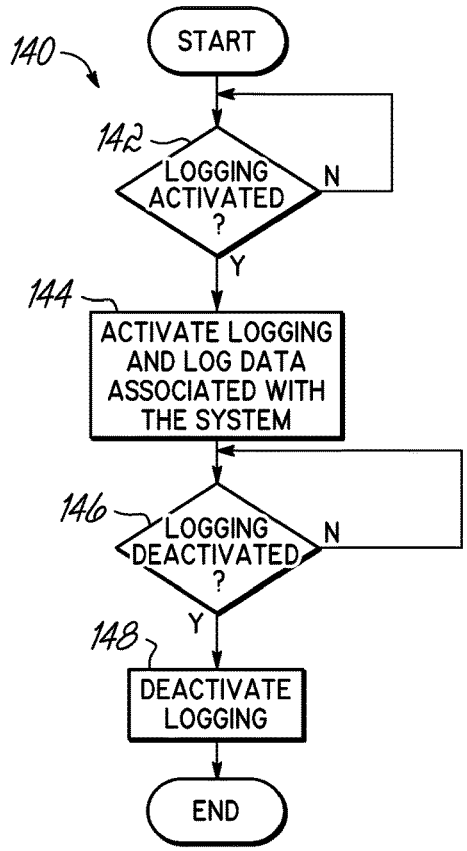
FIG. 7 is a flowchart illustrating a sequence of operations to selectively activate logging in the adaptive mobile system of FIG. 1.

The capture of data for the location and/or measurement information can be selectively turned on and/or off by a user, configured to run continuously such that they loop through an allocated memory space, and/or configured to run in response to a predetermined event and/or condition. For example, FIG. 7 is a flowchart 140 illustrating a sequence of operations to determine whether to commence logging of data in the system 12 consistent with embodiments of the invention. In particular, the system 12 initially determines whether logging has been selectively activated by a user (block 142). When the logging feature has not been activated by a user ("No" branch of decision block 142), the system 12 again loops to detect when logging has been selectively activated (block 142). When the logging has been activated ("Yes" branch of decision block 142), the system 12 activates diagnostic and location logging and logs data associated with the system 12, such as the location, speed, and direction of travel of the system 12, the signal characteristics of at least one signal received by the system 12 from at least one base station 14, the signal characteristics of at least one signal transmitted by the system 12 to at least one mobile unit 16, the signal characteristics of at least one signal received by the system 12 from the at least one mobile unit 16, the signal characteristics of at least one signal transmitted by the system 12 to the at least one base station 14, information about the base station 14, information about the mobile unit 16, information about an inside or outside environment associated with the system 12 (e.g., the environment inside or outside a mobile environment) and the time that the data was logged (block 144). Specifically, the system 12 logs the information in one or more data structures (e.g., files, databases, or tables in a database). The system 12 then determines whether logging has been deactivated (block 146). When the system 12 determines that logging is not deactivated ("No" branch of decision block 146) the system 12 continues to log data and again loops to determine when the logging feature has been deactivated (block 146). When the system 12 determines that logging has been deactivated ("Yes" branch of decision block 146) the system 12 deactivates logging (block 148).

Figure 8:
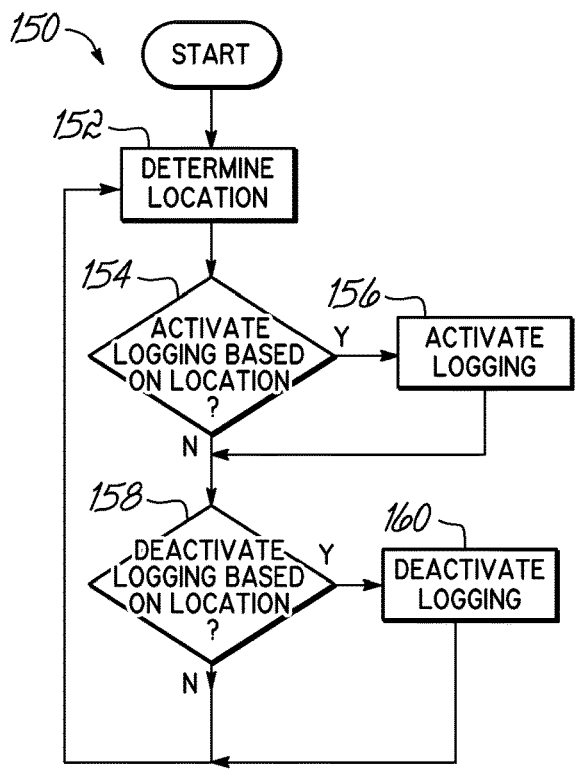
FIG. 8 is a flowchart illustrating a sequence of operations to selectively activate logging in the adaptive mobile system of FIG. 1 based upon that system's location.

An additional related feature is location-based triggering of data capture. To debug certain problems, it may be required to record very frequent measurements or measurements consisting of a very large set of data. It is not practical to leave these measurements running continuously because they would quickly fill available memory 26. Thus, users have the ability to define an area where these measurements would be activated. When the system 12 is within the user-defined area, data capturing is enabled. When the system 12 leaves the area, data capturing is disabled. FIG. 8 is a flowchart 150 illustrating a sequence of operations to activate and/or deactivate logging based on a determined location of the system 12 consistent with embodiments of the invention. In particular, the system 12 initially determines its location (block 152) and then determines whether to activate logging based on the location (block 154). As such, the system 12 may analyze the determined location with respect to at least one predetermined location at which to initiate logging. Thus, when the system 12 determines that there is a match between the current location and the predetermined location such that logging should be activated ("Yes" branch of decision block 154) the system 12 activates logging (block 156). After determining that logging should not be activated ("No" branch of decision block 154) or after the system 12 has activated logging (block 156), the system 12 determines whether to deactivate logging based upon the determined location (block 158). For example, the system 12 may be configured to log data only along a certain portion of a route, or otherwise in certain areas. As such, the system 12 may analyze the determined location with respect to at least one predetermined location at which to deactivate logging (block 158). Thus, when the system 12 determines that logging should be deactivated ("Yes" branch of decision block 158), the system 12 deactivates logging (block 160). After determining that logging should not be deactivated ("No" branch of decision block 158) or after the system 12 has deactivated logging (block 160), the system 12 loops to block 212 to determine its location.

Figure 9:
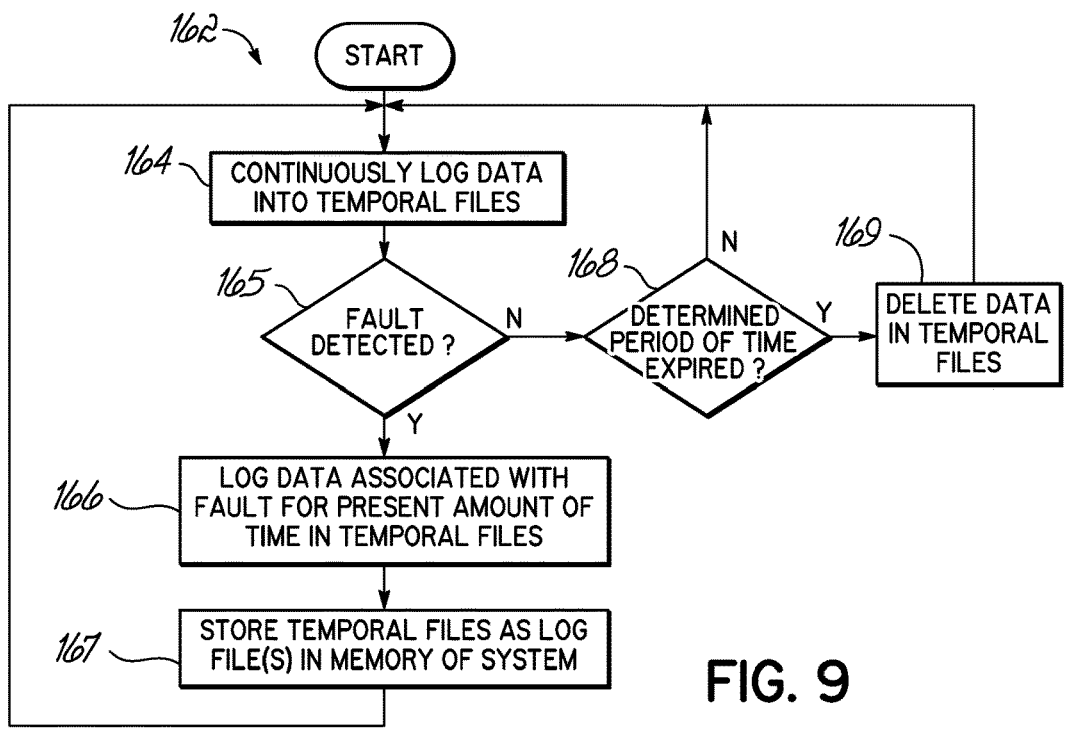
FIG. 9 is a flowchart illustrating a sequence of operations to selectively activate logging in the adaptive mobile system of FIG. 1 based upon detect a fault therein.

In the specific environment of a system 12 it is very difficult to troubleshoot a fault in the coverage of a mobile network as several specific factors may need to be reproduced. These include (1) the position of the system 12, (2) the current coverage from a base station 14, and (3) the mobile unit 16 scenario inside of the mobile environment, among others. As the specific conditions that cause a fault cannot easily be reproduced, a means is provided to capture information at the instant a fault occurs. This requires drive test-like capabilities for the internal logging and diagnostics which are able to identify the source and condition during the fault without the need to take any additional measurements after its occurrence. Thus, FIG. 9 is a flowchart 162 illustrating a sequence of operations to selectively activate logging in response to detecting a fault consistent with embodiments of the invention. In particular, the system 12 continuously logs data into one or more temporal files (block 164) then determines whether a fault has occurred (block 165). When a fault has occurred or is detected ("Yes" branch of decision block 165) the system 12 continues to log data associated with the fault for a preset amount of time (e.g., such as about one minute) in the one or more temporal files (block 166) then stores the data in the temporal files as one or more respective log files in the memory of the system 12 (block 167) in response to detecting a fault. However, when the system 12 determines that a fault has not occurred ("No" branch of decision block 165) the system 12 determines whether a predetermined period of time has expired (block 168). When the predetermined period of time has expired ("Yes" branch of decision block 168) the system 12 deletes the data in the one or more temporal files (e.g., by deleting the actual data in the files or simply deleting the files) (block 169) and the sequence of operations returns to block 164. However, when the predetermined period of time has not expired ("No" branch of decision block 168) the sequence of operations returns to block 164. In this manner, the system 12 is able to selectively log data for a short period of time before a fault as well as a short period of time after an fault. It does this by logging data into the one or more temporal files, then storing the one or more temporal files when there is a fault. Otherwise, data associated with the one or more temporal files is deleted. Thus, a user may be able to determine exactly what was occurring at the system 12 just before the fault, at the time of the fault, and just after the fault along with the location and conditions of the system 12 and its environment. In alternative embodiments, the system 12 may be configured to begin logging as soon as a fault is detected and keep logging for a predetermined time period after that fault is detected. As such, the system 12 may only detect information associated with that fault as well as information shortly after that fault is detected.

Embodiments of the invention implemented at the system 12 level provide the system 12 with location based diagnostics capable of determining the cause of a coverage malfunctions for end users in a mobile environment. Its internal algorithm is able to analyze all information related to the input and the output of the system 12 and can further determine the cause of possible failures to either the base stations 14 external to the system 12 or the system 12 itself at any time and location. Furthermore all operating conditions can be fully documented with log file.

One exemplary procedure to determine a fault in the coverage of a mobile network involves the following steps: (1) the determination of input signals, their frequency, quality (C/I, EMV, or MER), signal strength, and signal type with data identifying the beacon associated with those input signals (BCCH, MNC, MCC, CID, BCC, NCC, etc.) (2) the determination of output signals using the same list of parameters as in (1), (3) comparing parameters determined in (1) and (2) and raising alarms if they differ by more than a predetermined margin (which, in some embodiments, is likely to indicate problems with the system 12), and (4) comparing parameters in (1) with either previously determined data or a predefined threshold and raising an alarm condition if the difference is above or below a threshold or previously taken data plus or minus some margin. It will be appreciated that similar measurements may be taken for both downlink and uplink signals and/or time slots simultaneously to identify possible problems in the uplink signals at the same time.

An additional function allows the complete analysis of the mobile network coverage in the donor path in every location of the mobile network. The system 12 acts as an autonomous drive test tool that, if provisioned with enough memory space, allows the continuous analysis of the conditions of the mobile network. With its location sensors, the system 12 can even compare previous coverage levels and quality with current values and signal an alarm in case of significant changes. Alternatively, the analysis might only be limited to a certain geographic zone and triggered by the location of the system 12. This allows the specific monitoring of previously identified problem zones.

Figure 10:
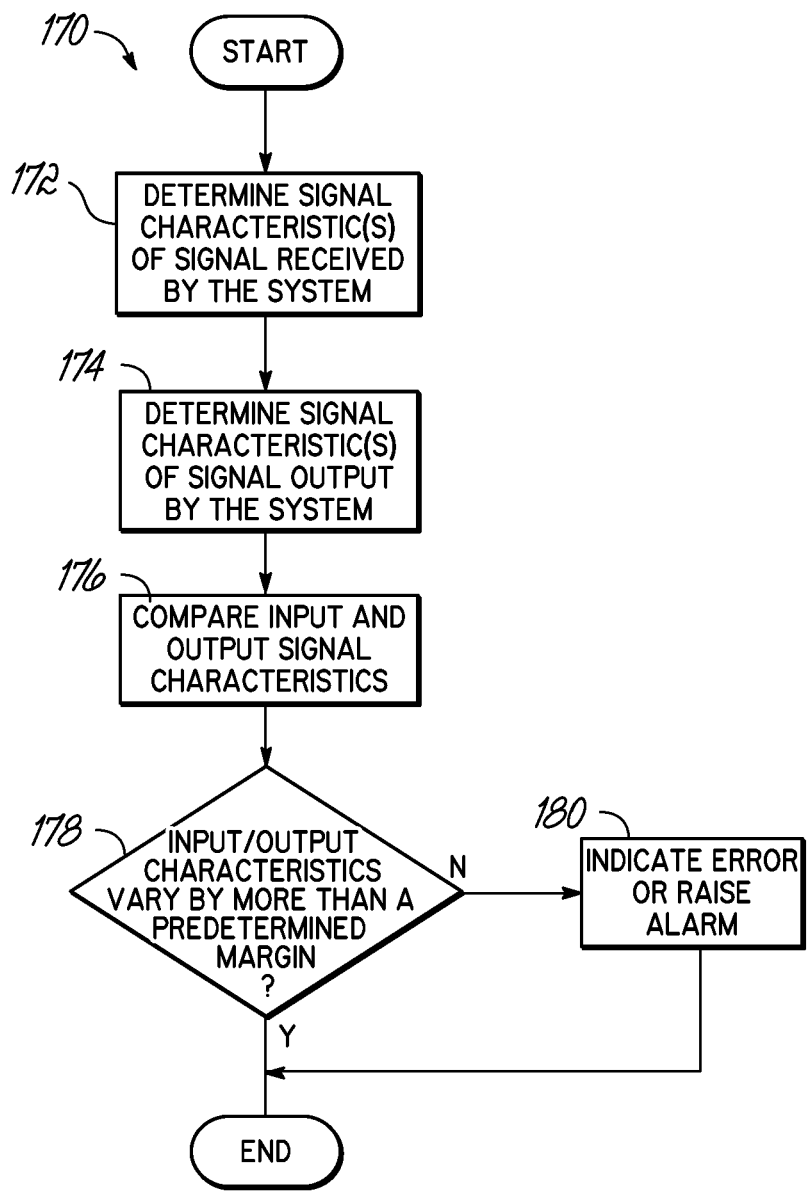
FIG. 10 is a flowchart illustrating a sequence of operations to indicate an error or raise an alarm based upon input and output signal characteristics of signals associated with the adaptive mobile system of FIG. 1.

For example, FIG. 10 is a flowchart 170 illustrating a sequence of operations to indicate alarms and/or errors when signal characteristics of signals received and transmitted by the system 12 vary by more than a predetermined margin consistent with embodiments of the invention. In particular, the sequence of operations determines a signal characteristic of a signal received by the system 12 (block 172) as well as a signal characteristic of a signal output by the system 12 (block 174). The system 12 then compares the input and output signal characteristics (block 176). In particular, the sequence of operations compares the input and output signal characteristics and determines if they vary by more than a predetermined margin (block 178). For example, a system 12 may suffer an internal error when the power of output signals of the system 12 (e.g., to the mobile units 16 or to the base stations 14) are significantly less than power of the input signals (e.g., respectively from the base stations 14 or from the mobile units 16). When the signal characteristics vary by more than the predetermined margin ("Yes" branch of decision block 178) an error and/or alarm is indicated (block 180). When the signal characteristics do not vary by more than the predetermined margin ("No" branch of decision block 178) or after an error and/or alarm is indicated (block 180), the sequence of operations ends.

Figure 11:
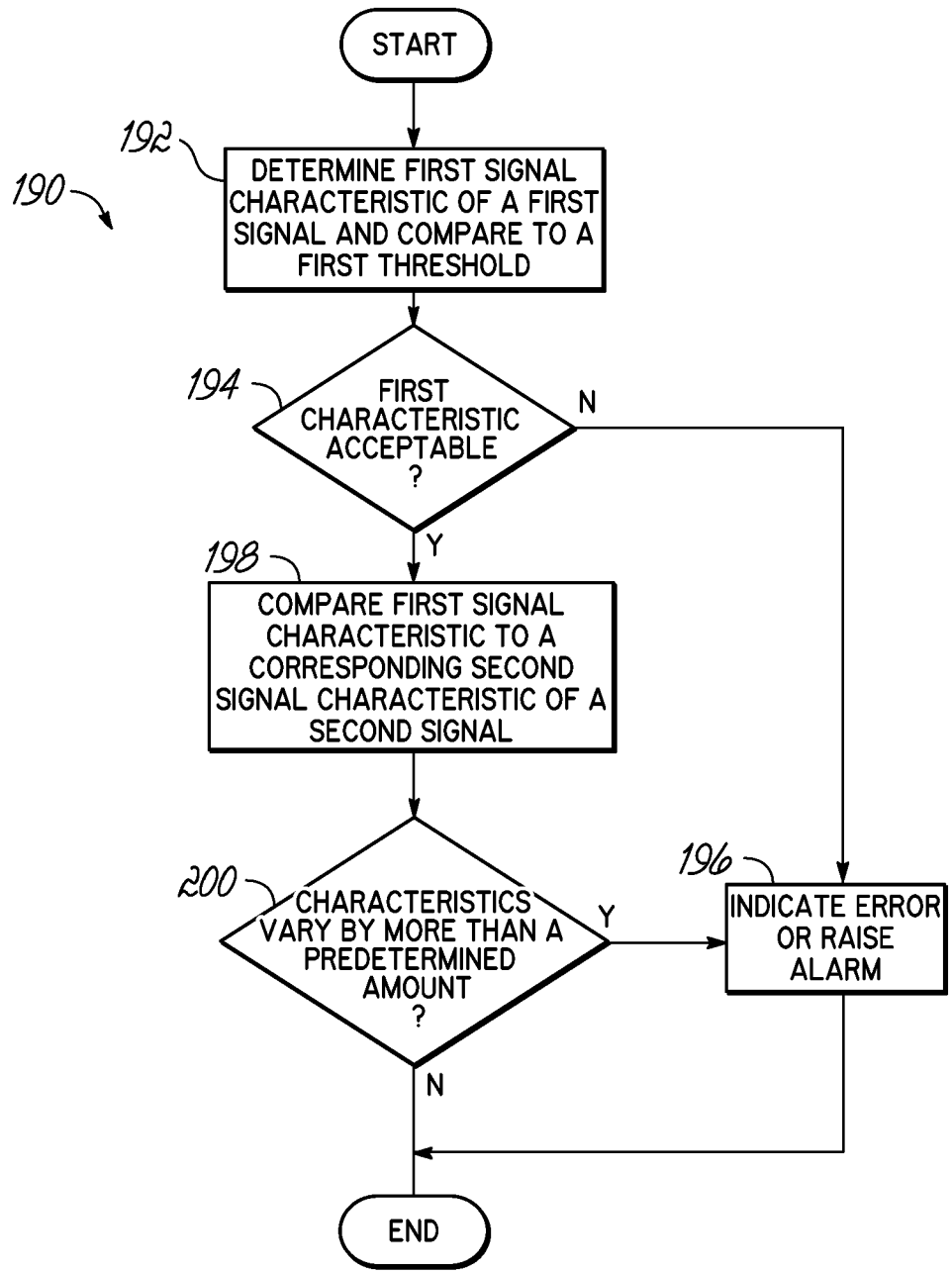
FIG. 11 is a flowchart illustrating a sequence of operations to indicate an error or raise an alarm based upon a signal characteristic of a signal as well as a comparison of that signal characteristic to a previously determined signal characteristic of a previous signal associated with the adaptive mobile system of FIG. 1.

Also for example, FIG. 11 is a flowchart 190 illustrating a sequence of operations to indicate alarms and/or errors when a signal characteristic does not meet a predetermined threshold and/or when that signal characteristic varies from a previously determined signal characteristic of a different signal consistent with embodiments of the invention. In some embodiments, the sequence of operations of FIG. 11 is executed by the system 12, and thus the system 12 automatically determines alarms or errors. In alternative embodiments, the sequence of operations of FIG. 11 is executed by a computing system separate from the system 12, which separately indicates alarms or errors. In particular, the sequence of operations determines a first signal characteristic of a first signal and compares that first signal characteristic to a predetermined threshold (block 192), then determines if the first signal characteristic is acceptable with relation to the threshold (block 194). For example, the signal characteristic may be a power of the signal, and the threshold may be the minimal power at which an intelligible signal can be repeated by the system (which may be a repeater 12*a* or a distributed system 12*b*). As such, when the first signal characteristic is not acceptable ("No" branch of decision block 194) an error or alarm is indicated (block 196). When the first signal characteristic is acceptable ("Yes" branch of decision block 196) the first signal characteristic is compared to a corresponding second signal characteristic of a second signal that has been previously determined (block 198). When the first and second signal characteristics vary by more than a predetermined amount ("Yes" branch of decision block 200), which may indicate a problem with the system 12, an error or alarm is indicated (block 196). When the characteristics do not vary by more than a predetermined amount ("No" branch of decision block 200), or after an error or alarm is indicated (block 196), the sequence of operations ends.

In some embodiments, information is generated from the log data that documents current and past performance of a system 12. In particular, FIG. 12 is a location/trace screen 210 that illustrates the location of a system 12 and its related signal characteristics. In some embodiments, and as illustrated in FIG. 12, a user may select a particular instance of data in a GPS trace location area as at 212 (e.g., a particular value in the "GPS TRACE" area) and view the signal characteristics associated with that selected instance of data in an RF trace location area as at 214 (e.g., in the "RF TRACE" area). In this manner, a user can manually view location data and signal characteristics associated therewith. However, this is often time consuming. In specific embodiments, for each instance of data in the GPS trace location area 212 (as illustrated in FIG. 12, there are four instances of data), the location/trace screen 210 indicates a local timestamp of the data generated by the system 12 at the time the data was captured in the column labeled "TIME," as well as a coordinated universal time ("UTC") timestamp reported from the GPS receiver device 34 at the time the data was captured in the column labeled "UTC." The location/trace screen 210 further indicates, at the time the data was captured, the latitude, longitude, altitude, speed, and radial direction reported by the GPS receiver device 34 in the respective "LATITUDE," "LONGITUDE," "ALTITUDE," "SPEED," and "DIRECTION" columns. In addition, the location/trace screen 210 further indicates the number of satellites that the GPS receiver device 34 receives signals from (or "views") in the "VIEW" column, as well as the satellite "fix" in the "FIX" column. The values for the satellite fix are "00" for no fix, "10" for a 2D fix, and "11" for a 3D fix. Finally, the location/trace screen 210 further indicates the horizontal dilution of precision (as calculated by the controller 24 of the system 12 or as calculated by the GPS receiver device 34) in the "HDoP" column. The horizontal dilution of precision uses the geometry of the satellites to determine the level of precision in the signals therefrom and may range on a scale from 1.0 (the best possible reading) to 25.0 (the worst possible reading).

In addition to the GPS trace area 212, the location/trace screen 210 also includes the RF trace area 214 that indicates signal characteristics associated with a particular instance of data. As illustrated in FIG. 12, the first instance of data in the GPS trace area 212 has been selected, resulting in the RF trace area 214 being populated with signal characteristics associated with that particular instance of data. In specific embodiments, the RF trace area 214 includes a "MESSAGE" column to indicate the type of message received, a timestamp of the local time the instance of data was logged in a "TIME" column, as well as an indication of which module of the system 12 (e.g., which repeater 12*a* or distributed antenna system 12*b*) reported the data in a "MODULE" column. Additionally, the RF trace area 214 includes a frame indication of the data in the signal in a "FRAME" column (which may range from 0 to 10000) and a frame sequence indication of the data in the signal in a "FRAME SEQ" column (with the frame sequence being incremented when there is a change in the gain of the signal above a predetermined level, each repeater 12*a* and/or distributed antenna system 12*b* of the system 12 tracking its individual frame sequence). The RF trace area 214 additionally includes a count of the remaining trace measurements for multiple message traces in a "TRC COUNT" column.

In some embodiments, the RF trace area 214 further includes a group indication of the number corresponding to a subband "group" from which the data is reported in the "GROUP" column as well as a gain indication of the group in dB in a "GAIN" column. The RF trace area 214 further includes a peak received signal strength indicator for the group in dB full scale units ("dBfs") in a "Pk RSSI dBfs" column, a peak received signal strength indicator for the group in dBm in a "Pk RSSI dBm" column, a predicted received signal strength indicator for the group in dBfs in a "PRED RSSI dBfs" column, a predicted received signal strength indicator for the group in dBm in a "PRED RSSI dBm" column, an average value of the received signal strength indicator in dBfs in an "AVG RSSI dBfs" column, and an average value of the received signal strength indicator in dBm in an "AVG RSSI dBm" column.

Figure 13:
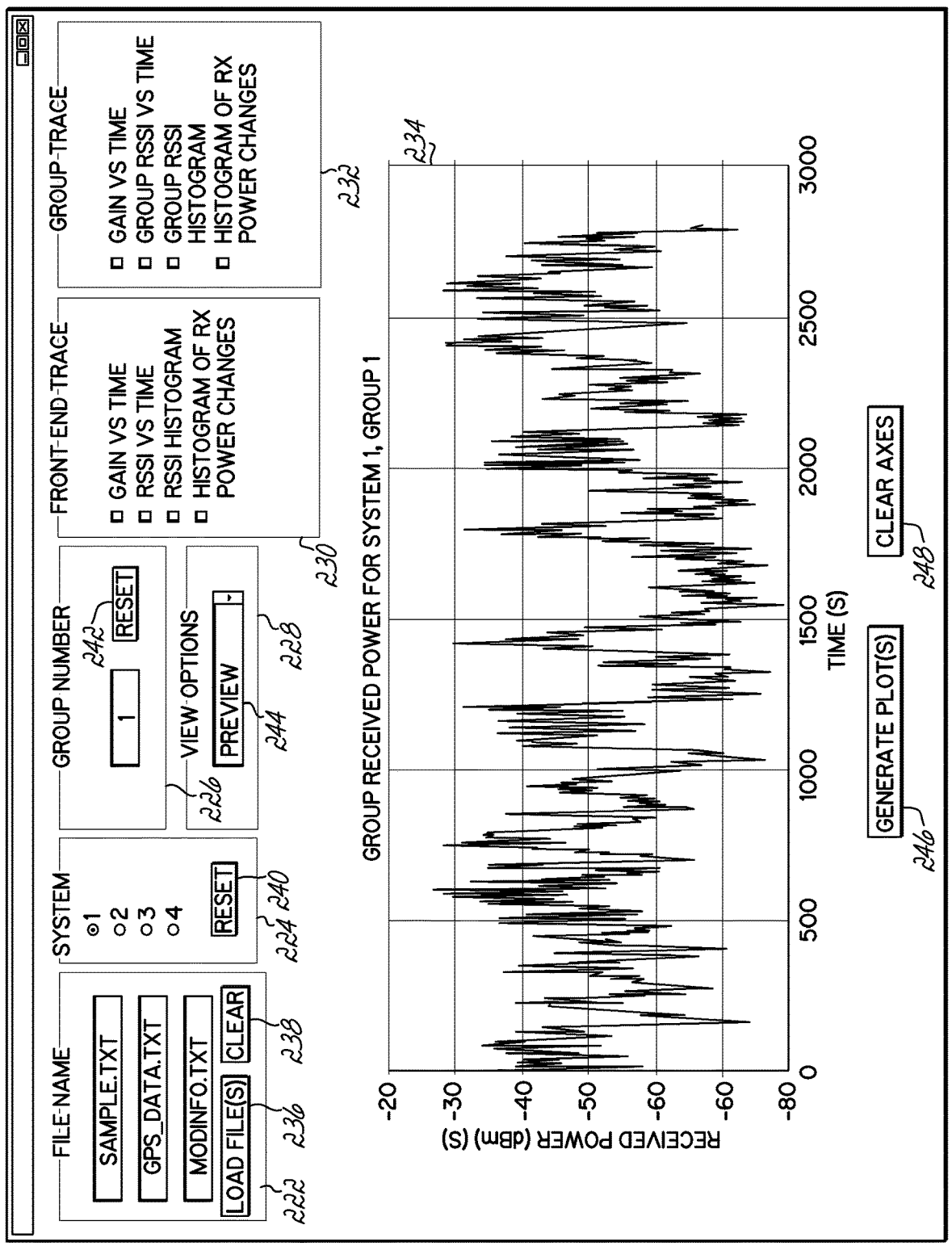
FIG. 13 is a screenshot of a screen for a user to view information associated with the mobile communication system of FIG. 1, and particularly at least one adaptive mobile system thereof.

Additionally, embodiments of the invention allow the automatic generation of predefined reports documenting the current and past performance of the system 12. For example, a report of the coverage signal level with an indication of the most probable location of a base station can be shown on a map display, such as illustrated in FIG. 4. Moreover, FIG. 13 is an illustration of a log file selection and information screen 220 ("file screen" 220) that may be displayed by an output device in which a user may select files to upload to view information associated therewith. As illustrated in FIG. 13, the file screen 220 includes a file selection module 222, a system selection module 224, a group selection module 226, a view selection module 228, a front-end trace selection module 230, a group trace selection module 232, and a preview module 234. The file selection module 222 allows a user to specify log files to load to view information associated therewith. In particular, the file selection module 222 allows a user to load up to three log files. In some embodiments, the program code for the file selection module 222 looks for the log files in a particular directory of a system 12 and/or computing system such that the user can simply type in the name of the log files. In alternative embodiments, the program code for the file selection module 222 includes calls to a file selection utility, such as a Windows® file selection dialog box, to specify which files to include. As illustrated in FIG. 13, the user has loaded a sample log file (e.g., "SAMPLE.TXT") that contains sample information about at least one system 12, a location log file (e.g., "GPS_DATA.TXT") that contains location information associated with at least one system 12, and a modification log file (e.g., "MODINFO.TXT") that contains information about the modification of the configurable settings of the at least one system 12. The user loads at least one log file by selecting a "Load File(s)" button 236 or clears selected log files by selecting a "Clear" button 238.

In the system selection module 224, the user may select a specific system 12 (e.g., a specific repeater 12a or distributed antenna system 12b) to view information associated therewith. Similarly, in the group selection module 226, the user may select a group of systems 12 to view information associated therewith. In particular, a plurality of systems 12 may be configured on a particular mobile environment. A subset of these systems 12 may be configured into a group. For example, the train 18 may be configured with four systems 12 (e.g., four homogenous or heterogeneous systems 12). The two systems 12 closest to the front of the train 18 may be configured in a first group, while the two systems 12 closest to the rear of the train 18 may be configured in a second group. As such, a user may view information about a plurality of systems 12 individually or in defined groups. One having ordinary skill in the art will further appreciate that a user may view information about the plurality of systems 12 together. The user clears a selected system 12 by selecting a "Reset" button 240, or clears a selected group of systems 12 by selecting a "Reset" button 242. In the view selection module 228, the user may select an option from a drop down selection 244 to view a graph or histogram, such as in the preview module 234, as a separate figure, or a subplot that includes selected information.

In the front-end trace selection module 230, the user may select a trace to view associated with a system 12. For example, the user may select to view a graph of the gain of signals received by a particular system 12 over time, the received power of signals received by the system 12 over time, a histogram of the received power of signals received by the system 12, as well as a histogram of received power changes for signals received by the system 12. The user may select to view the disclosed information by selecting corresponding check boxes in the front-end trace selection module 230. In addition, one having ordinary skill in the art will appreciate that the user may select additional data to view, such as the change in gain of signals received by the system 12 over time, the received power prediction error of the system 12 over time (e.g., the predicted error in power of signals that will be received by the system 12 over time, such as during the time when that system 12 is moving along a route), the received power of signals received by the system 12 in relation to a time or location, and a figure illustrating BCCH information associated with the system 12 in relation to a time or location.

In the group trace selection module 232, the user may select a trace to view associated with a system 12. For example, the user may select to view a graph of the gain of signals received by a group of repeaters over time, the received power of signals received by the group of systems 12 over time, a histogram of the received power of signals received by the group of systems 12, as well as a histogram of received power changes for signals received by the group of systems 12. Similarly to the front-end trace selection module 220, the user may select to view the disclosed information by selecting corresponding check boxes in the group trace selection module 232. In addition, one having ordinary skill in the art will appreciate that the user may select additional data to view, such as the change in gain of signals received by the group of systems 12 over time, the received power prediction error of a group of systems 12 over time (e.g., the predicted error in power of signals that will be received by the group of systems 12 over time, such as during the time when that group of systems 12 is moving along a route), the received power of signals received by the group of systems 12 in relation to a time or location, and a figure illustrating BCCH information associated with the group of systems 12 in relation to a time or location.

The user may generate plots, subplots, figures, or other histograms by selecting the "Generate Report(s)" button 146, or clear plots, subplots, figures, or other histograms by selecting the "Clear Axes" button 148.

Figure 14:
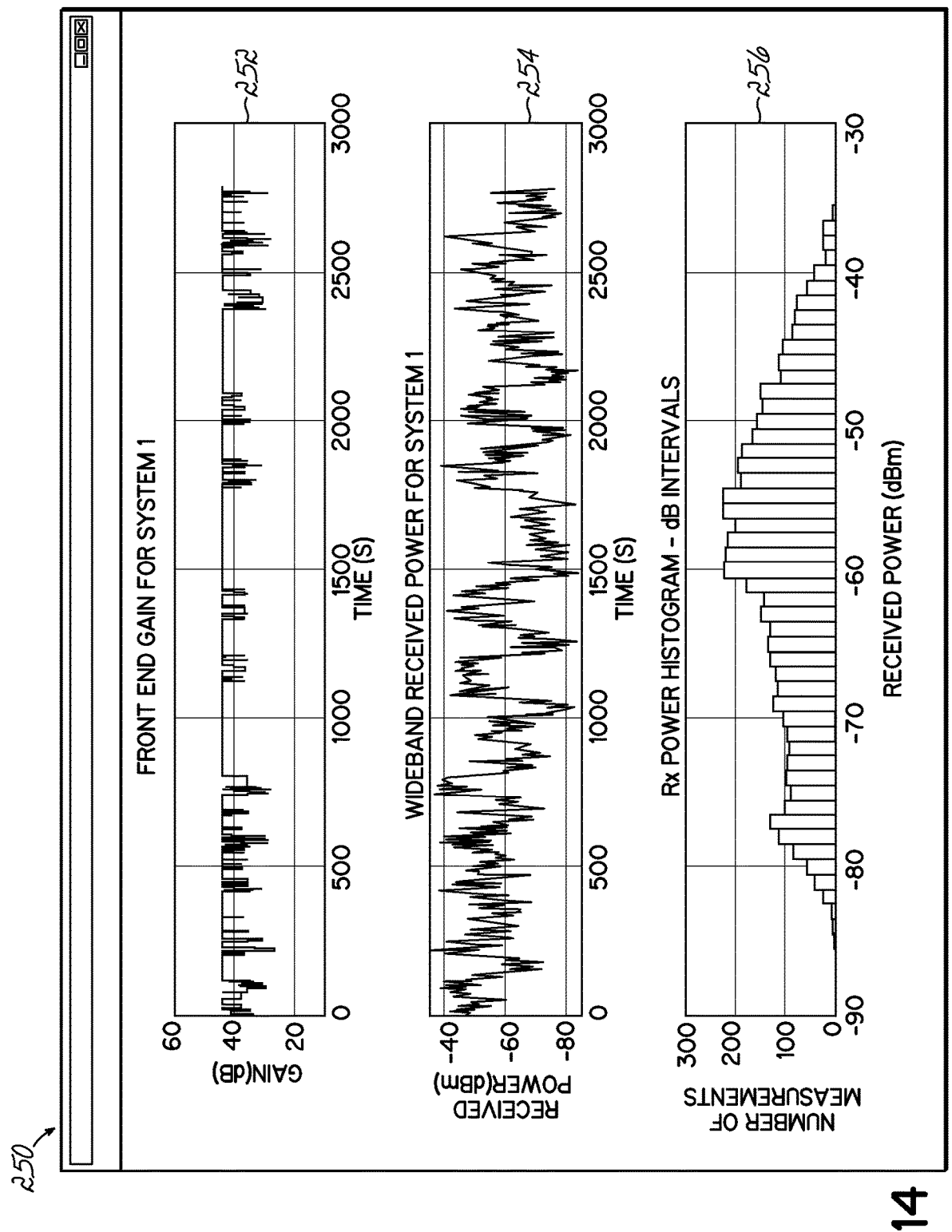
FIG. 14 is a screenshot of a screen for a user to view information associated with one adaptive mobile system of the mobile communication system of FIG. 1.
Figure 15:
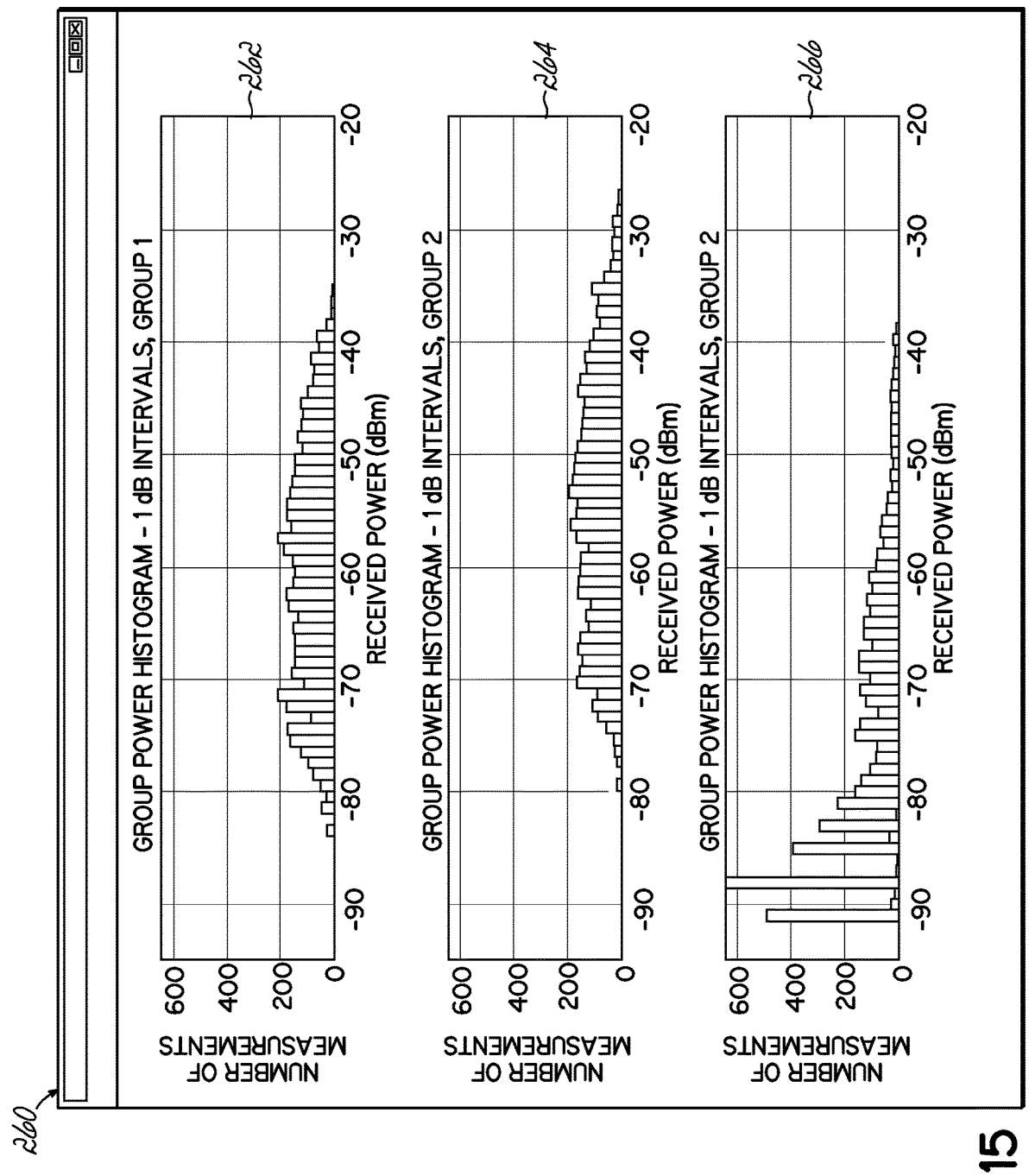
FIG. 15 is a screenshot of a screen for a user to view information associated with a plurality of adaptive mobile systems of the mobile communication system of FIG. 1.

In some embodiments, a user can view various additional measurements from a system 12, such as breakdowns of specific signal characteristics over time or histograms associated therewith. For example, FIG. 14 is an illustration of a system screen 250 that illustrates the gain of signals received by a system 12 over time in a first plot 252, the received power of signals received by a system 12 over time in a second plot 254, as well as a histogram indicating the received power of signals received by the system 12 in a third plot 256. Alternatively, the user can view various information about a group of systems 12. As another example, FIG. 15 is an illustration of a group screen 260 that illustrates a histogram of the power of signals received by a first group of systems 12 in a first plot 262, a histogram of the power of signals received by a second group of systems 12 in a second plot 264, as well as a histogram indicating the power of signals received by a third group of systems 12 in a third plot 266.

Typically, one of the challenges of designing a system 12 is designing an effective automatic gain control circuit, such as AGC 39, that reacts quickly to changing donor signal levels, but not reacting so quickly as to impair the signal fidelity or adversely affect the power control loop that operates between the base stations 14 and mobile units 16 that communicate through the system 12. Typically, the AGC circuits 39 or algorithms operate by reacting to changes in the received signal strength. Embodiments of the invention improve AGC circuit 39 performance by providing a system 12 that anticipates changes in signal strength using the location of the system 12 and the path it is taking along with the location of the sources of the signals it is repeating along with stored profiles of the typical received signal strength in the area through which the system 12 is moving.

The system 12 anticipates received signal strength changes as it moves through different areas based on previously determined measurements and location information it recorded during prior passages through the same areas or otherwise obtained from the computing system 37 or another system 12. The system 12 is configured to use this past information to proactively make appropriate AGC changes in expectation of the signal changes occurring instead of after the fact. This increases the average dynamic range of the system 12 because it needs to maintain less margin for changes in received signal strength, and it reduces the probability of clipping or saturating in the signal path. Additionally, the time averaging parameters of the AGC algorithm are lengthened or shortened depending on the expected rate of signal strength change based upon the current speed and/or location of the system 12.

The expected signal strength is obtained through several methods in accordance with features of the present invention. One embodiment of the invention decodes geographic coordinates transmitted by the signal sources and make adjustments based on location. The system 12 decodes these coordinates, and by comparing the coordinates of the signal source (e.g., base stations 14) with the coordinates of the system 12, the system 12 anticipates how the signal level of the received signal will change due to the change in distance between the transmitter and receiver.

Another embodiment of the invention involves the system 12 learning how the signal levels change relative to the location on the system 12. Oftentimes, a system 12 follows a well-defined path (for instance if the system 12 is in a train 18). The system 12 can generate and maintain a signal level vs. location database to help it anticipate received signal levels as it travels a particular path. Alternatively, the signal strength vs. location database may be uploaded to the system 12 from an external source. This can be a general data base, covering all the areas where the system 12 might be located, or a more specific database tailored for the specific path that the system 12 would follow. This database could also include the location of the base stations 14 of the signal sources that will be received by the system 12.

Another embodiment uses features from other embodiments combined. Signal vs. location information can be measured and recorded by a system 12, as well as the decoded locations of the signals received by the system 12, and then this data is periodically uploaded to a central location where the data from many systems 12 can be gathered and analyzed to produce a combined signal strength vs. location database. This combined data base can then be downloaded in whole or in part to system 12.

Figure 16:
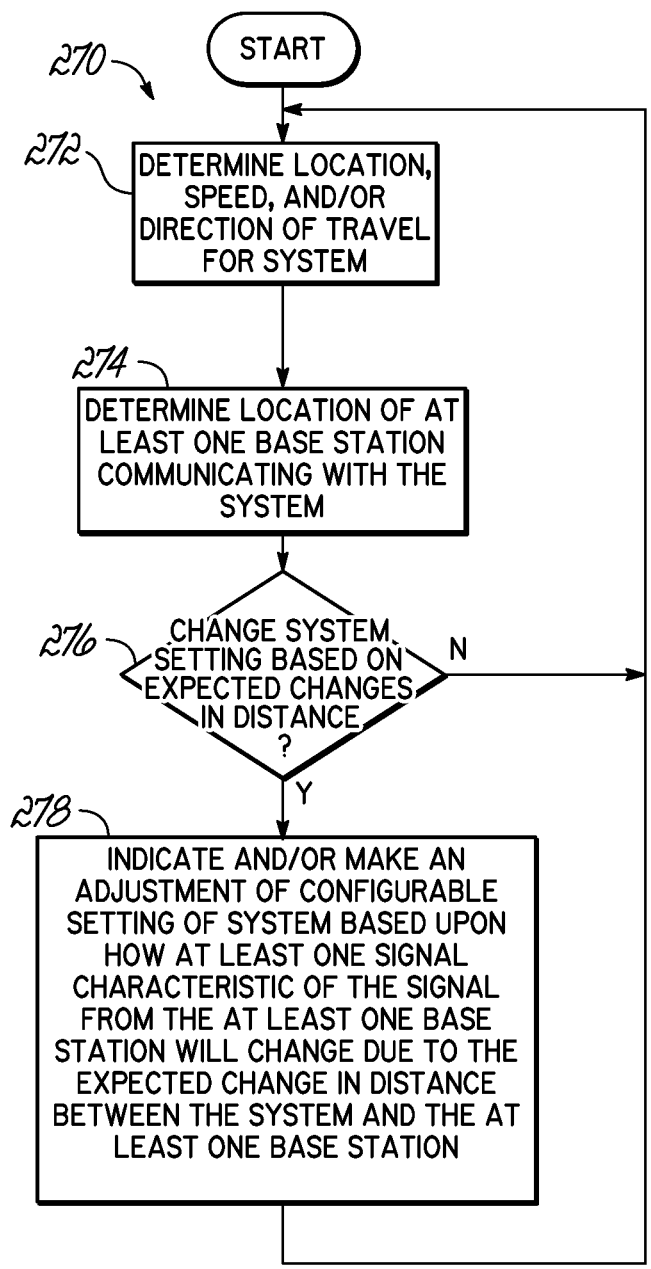
FIG. 16 is a flowchart illustrating a sequence of operations to indicate or make an adjustment to at least one configurable setting of the adaptive mobile system of FIG. 1 in advance to an expected event and/or condition.

Thus, FIG. 16 is a flowchart 270 illustrating a sequence of operations to indicate or make an adjustment to at least one configurable setting of at least one system 12 in response to a location, speed, and/or direction of travel of the system 12 along with its relation to the location of a base station 14 consistent with embodiments of the invention. In some embodiments, the sequence of operations of FIG. 16 is executed by a system 12, and thus the system 12 automatically makes the adjustment to its configurable settings. In alternative embodiments, the sequence of operations of FIG. 16 is executed by a computing system separate from the system 12, wherein the results of how to adjust at least one setting of the system 12 are loaded into the system 12 once determined. In particular, the sequence of operations determines the location, speed, and/or direction of travel for at least one system 12 (block 272) and determines the location of at least one base station 14 that communicates with the system 12 at the location that has been determined for the system (block 274). The sequence of operations then determines whether to change a configurable setting of the system 12 based on expected changes in distance between the system 12 and the base station 14 that is in contact with the system (block 276). For example, if the system 12 is moving toward a base station 14, it may be advantageous to reduce the gain applied to signals received from the base station 14 as the system 12 moves toward it to reduce signal noise, prevent signal interference, and/or protect the components of the repeater. Correspondingly, and also for example, if the system 12 is moving away from a base station 14, it may be advantageous to increase the gain applied to signals received from the base station 14 as the system 12 moves away from it to increase the power of the repeated signals. In the above examples, the rate of change of a setting of the system 12 may be based upon the speed of the system 12 relative to the base station 14. For example, the faster the speed of the system 12 relative to the base station 14, the faster the adjustment of its setting.

Thus, when the sequence of operations determines to change a system 12 setting ("Yes" branch of decision block 276), an adjustment of at least one configurable setting of the at least one system 12 based upon how at least one signal characteristic of at least one signal from the at least one base station 14 will change due to the expected change in distance between the at least one system 12 and the at least one base station 14 is indicated and/or made (block 278). For example, the gain of the system 12 may be increased as the system 12 moves away from the base station 14, the gain of signals received by the system 12 may be decreased as the system 12 moves away from the base station 14, the system 12 may filter more noise from signals as the system 12 moves away from the base station 14, etc. When the sequence of operations determines not to change a system 12 setting ("No" branch of decision block 276) or after an adjustment has been indicated and/or made (block 278), the sequence of operations may proceed back to block 272 to determine the location, speed, and/or direction of travel for the system 12.

Figure 17:
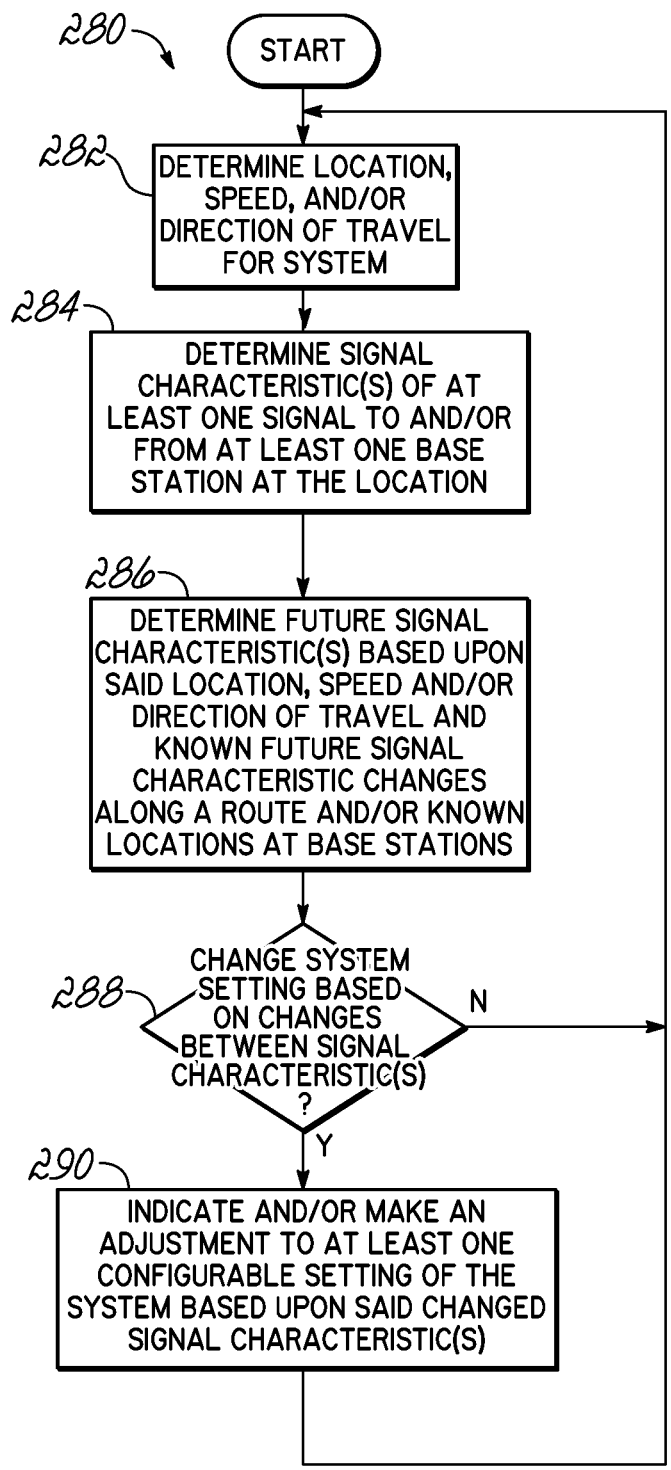
FIG. 17 is a flowchart illustrating a sequence of operations to indicate or make an adjustment to at least one configurable setting of the adaptive mobile system of FIG. 1 in advance to at least one signal characteristic of a signal detected by that adaptive mobile system and an expected event and/or condition.

FIG. 17 is a flowchart 280 illustrating a sequence of operations to indicate or make an adjustment to at least one configurable setting of a system 12 in response to a measured or determined location, speed, and/or direction of travel of the system 12 and the signal levels and characteristics that are associated with that measured or determined parameter. For example, a signal level versus location database might be implemented. Various different measurement parameters or characteristics versus location might also be maintained in a database.

In some embodiments, the measurements/determinations and sequence of operations of FIG. 17 are executed by a system 12 to generate and maintain a database of measurements, and thus the system 12 automatically makes the adjustment to its configurable settings based on those earlier measurements. In alternative embodiments, the measurements/determinations and sequence of operations of FIG. 17 to generate and maintain the database, is executed by a computing system 37 separate from the system 12, wherein the results are then uploaded into the memory of system 12 once determined. In particular, the sequence of operations determines the location, speed, and/or direction of travel for at least one system 12 (block 282) and measurements are made to determine the signal characteristics of at least one signal to and/or from at least one base station 14 (block 284). This information is stored in memory or a database to be used in the future by the system 12. Then, during operation, the system 12 uses the stored information and determines what the future or upcoming signal characteristics will likely be for the mobile system in its travels based on the earlier measured and stored data (known future signal characteristic) and based upon the determined location, speed, and/or direction of travel (block 286). Thus, the system 12 compares the one or more current signal characteristics to the one or more stored or "future" signal characteristics and determines whether to change a configurable setting of the system 12 based upon a difference between the current and future signal characteristics (block 288).

For example, the sequence of operations may determine that, at a particular location and along a particular direction of travel, a future characteristic of a signal indicates that its received power will increase. Thus, it may be advantageous for the system 12 to reduce the gain applied to that signal proactively to reduce signal noise, prevent signal interference, and/or protect the components thereof. Alternatively, and also for example, the sequence of operations may determine that, at a particular location and along a particular direction of travel, a future characteristic of a signal indicates that its power will decrease. Thus, it may be advantageous for a system 12 to increase the gain applied to that signal proactively.

In accordance with one embodiment of the invention, the rate of change of a setting for the system 12 is based upon the speed of the system 12 relative to the location of the future signal characteristic. For example, the faster the speed of the system 12 relative to the location of the future signal characteristic, the faster the adjustment of the system 12 setting is implemented to adapt.

As such, when the sequence of operations determines to change a system setting ("Yes" branch of decision block 288), an adjustment of at least one configurable setting of the system 12 is indicated and/or made (block 290). For example, the gain of the system 12 may be increased when future signal characteristics indicate that the power level of a received signal is low. Or the gain for signals may be increased when future signal characteristics indicate that future signals to be encountered by the mobile system require less attenuation. When the sequence of operations determines not to change a repeater setting ("No" branch of decision block 288) or after an adjustment has been indicated and/or made (block 290), the sequence of operations may proceed back to block 282 in a loop to determine future adjustments based on the stored information.

Figures 18, 19:
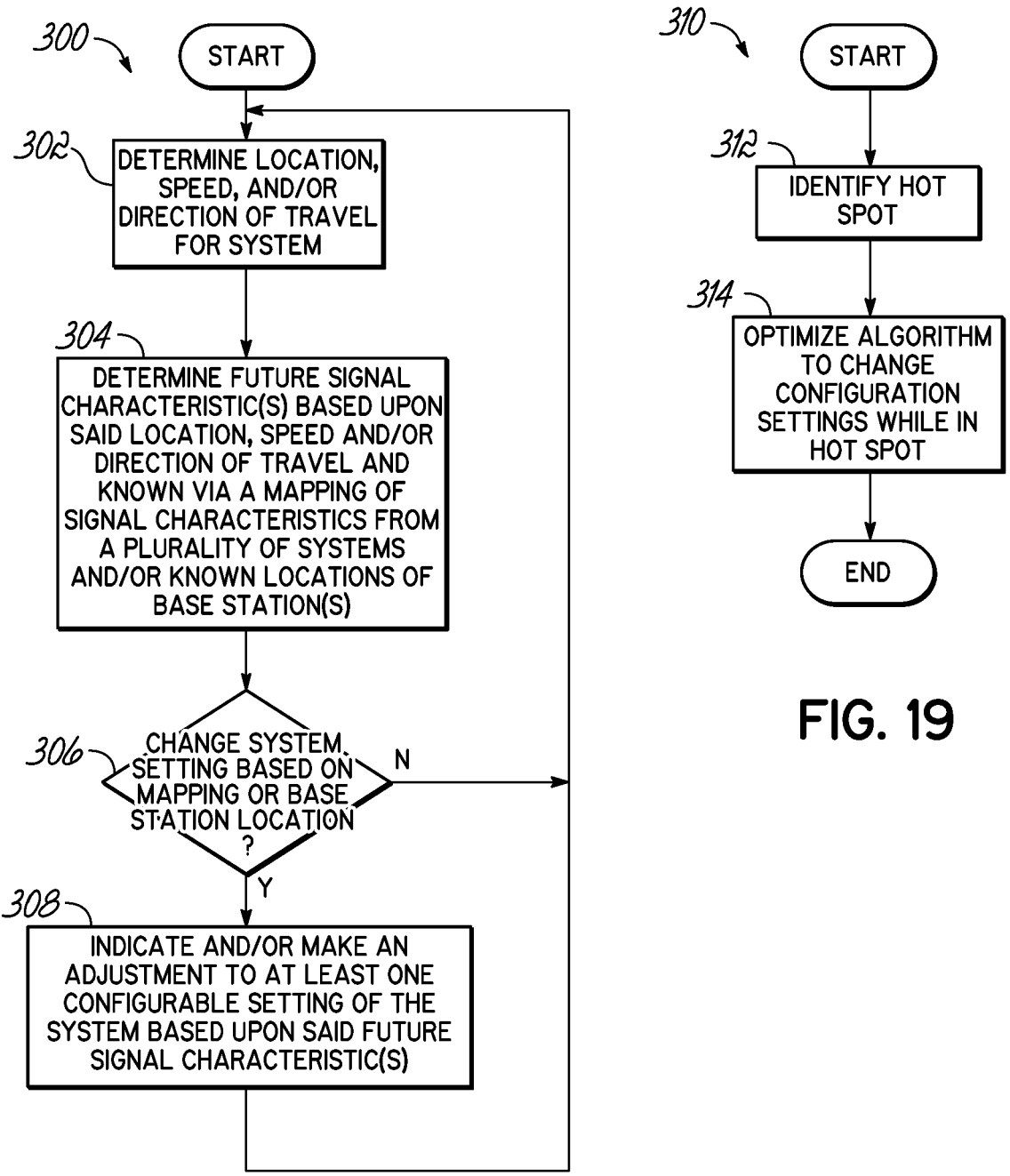
FIG. 18 is a flowchart illustrating a sequence of operations to indicate or make an adjustment to at least one configurable setting of the adaptive mobile system of FIG. 1 in response to a mapping of signal characteristics and/or the known location of at least one base station.
FIG. 19 is a flowchart illustrating a sequence of operations to identify hot spots and optimize the change of configurable settings of the adaptive mobile system of FIG. 1 in response to such identification.

In another embodiment, measured and stored data from multiple systems for a particular location is used by the system. That is, data from the multiple systems is gathered, analyzed, determined with respect to location, and stored in a database. The combined database is then downloaded in whole or in part to the system. FIG. 18 is a flowchart 300 illustrating a sequence of operations to indicate or make an adjustment to at least one configurable setting of a system 12 in response to a measured or determined location, speed, and/or direction of travel of the system 12 and the signal levels and characteristics that are associated with that measured or determined parameter based upon a mapping of data from multiple systems. In particular, the system 12 determines the location, speed, and/or direction of travel for at least one system 12 (block 302). Then, using stored database information from multiple systems, the system 12 determines at least one future signal characteristic based upon the location, speed, and/or direction of travel of the system 12 and based upon the known mapping of future signal characteristics or known locations of base stations 14 (block 304). The system 12 then determines whether to change at least one configurable setting of the system 12 based upon the mapping or determined location of at least one base station 14 (block 306). For example, when the sequence of operations determines that a system 12 is entering an area that the mapping indicates is associated with higher signal strength, or is closer to at least one base station 14, it may be advantageous for a system 12 to apply less gain to a signal proactively to reduce signal noise, prevent signal interference, and/or protect the components thereof. Correspondingly, when the sequence of operations determines that a system 12 is entering an area that the mapping indicates is associated with lower signal strength, or is further away from at least one base station 14, it may be advantageous for a system 12 to increase the gain of the system 12 proactively. As such, when the sequence of operations determines to change a system 12 setting ("Yes" branch of decision block 306), an adjustment of at least one configurable setting of the system 12 based upon the mapping and/or location of at least one base station 14 is indicated and/or made (block 308). When the sequence of operations determines not to change a repeater setting ("No" branch of decision block 306) or after an adjustment has been indicated and/or made (block 308), the sequence of operations may proceed back to block 302 in a loop determine future adjustments based on the stored information.

To reduce the size of the signal strength vs. location database, it may be preferable to identify 'hot-spots,' which are areas where the signal strength is very high. These hot-spots are typically relatively small areas very close to the base stations 14. When the system 12 moves through these hot-spots, the signal strength can change very rapidly, so by identifying these areas the AGC algorithm can be optimized for rapid signal changes when the system 12 enters a hot-spot. As such, FIG. 19 is a flowchart 310 illustrating a sequence of operations to optimize the algorithm to change configurable settings in hot spots. In particular, a system 12 identifies a hot spot based upon a signal strength or known location of the hot spot (block 312). In response, the system 12 optimizes its algorithm to change configuration settings while in that hot spot (block 314). This optimization may include increasing the speed at which the system 12 determines signal characteristics, increasing the speed at which the system 12 compares current signal characteristics to future signal characteristics and/or mappings, turning off logging of data to reduce the computational requirements of the system but still monitoring signal characteristics to determine whether adjustments to configuration settings are necessary, and/or similar measures.

Thus, a system 12 consistent with embodiments of the invention can anticipate changes in signal characteristics by using the location of the system 12, its speed, and/or the path upon which it is traveling as well as the location of base stations 14, stored indications of changing signal characteristics, and/or additional factors to adjust configurable settings associated therewith. A system 12 consistent with embodiments of the invention can react quickly to changing signal levels, and be configured to react with such a speed as to prevent impairing signal fidelity or otherwise adversely affect a power control loop that operates between base stations 14 and mobile units 16 that communicate through the system 12. It will be appreciated that the changing of the configurable settings may include additional considerations of temperature, humidity, and/or other environmental information. For example, when the weather is excessively hot and/or humid and a future characteristic of a signal indicates that the power of the signal should be increased, the system 12 may increase the power of the signal past a normal amount due to the weather being hot and/or humid. Correspondingly, when the weather is excessively cold and/or dry and the system 12 is moving toward a known location of a base station, the system 12 may decrease the gain of the signal from the base station past a normal amount due to the weather being cold and/or dry.

A person having ordinary skill in the art will recognize that the environments illustrated in FIGS. 1, 2A, 2B, and 3-19 are not intended to limit the scope of embodiments of the invention. In particular, the system 12 may include fewer or additional components and/or be communicably coupled to more or fewer components consistent with alternative embodiments of the invention. Indeed, a person having skill in the art will recognize that other alternative hardware and/or software environments may be used without departing from the scope of the invention. For example, the system 12 may be configured to interface with an alternative location identifying device other than the GPS receiver device 34, such as a radio navigation system device, or an alternative satellite navigation system, such as the GLONASS system and/or the forthcoming Galileo and/or COMPASS navigation systems. Additionally, a person having ordinary skill in the art will appreciate that the system 12 may include additional data structures, such as databases, data tables, and/or other data storage components. As such, other alternative hardware and software environments may be used without departing from the scope of embodiments of the invention.

The routines executed to implement the embodiments of the invention, whether implemented as part of an operating system or a specific application, component, program, object, module or sequence of instructions executed by one or more repeaters or other computing systems have been referred to herein as a "sequence of operations," a "program product," or, more simply, "program code." The program code typically comprises one or more instructions that are resident at various times in various memory and storage devices in a repeater or computing system, and that, when read and executed by one or more processors of the system 12 or computing system 37, cause that system 12 or computing system 37 to perform the steps necessary to execute steps, elements, and/or blocks embodying the various aspects of the invention.

While embodiments of the invention have been described in the context of fully functioning repeaters, distributed antenna systems, and computing systems, those skilled in the art will appreciate that the various embodiments of the invention are capable of being distributed as a program product in a variety of forms, and that the invention applies equally regardless of the particular type of computer readable signal bearing media used to actually carry out the distribution. Examples of computer readable signal bearing media include but are not limited to physical and tangible recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various program code may be identified based upon the application or software component within which it is implemented in a specific embodiment of the invention. However, it should be appreciated that any particular program nomenclature is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Furthermore, while embodiments of the invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, a person having ordinary skill in the art will appreciate that any of the blocks of the above flowcharts may be deleted, augmented, made to be simultaneous with another, combined, or be otherwise altered in accordance with the principles of the embodiments of the invention. Accordingly, departures may be made from such details without departing from the spirit or scope of applicants' general inventive concept.

Other modifications will be apparent to a person having ordinary skill in the art. Therefore, the invention lies in the claims hereinafter appended.

What is claimed is:
1. A communication system, comprising:
at least one receive antenna configured to receive communication signals;
processing circuitry configured to process the received communication signals;
at least one transmit antenna configured to transmit the processed signals;
a GPS receiver device;
a memory, wherein the processing circuitry is further configured to store current location information in the memory with a timestamp indicating the time the processing circuitry received the current location information, wherein the current location information comprises:
a power of signals received and/or communicated by the communication system;
a quality of signals received and/or communicated by communication system;
a particular network the communication system is communicating on;

a location of the communication system when data is captured; and/or a time that the information is captured;

wherein the current location information is stored in log-files, wherein the processing circuitry is configured to utilize at least one configurable setting in the processing of the received communication signals, each configurable setting being adaptable for varying the operation of processing the received communication signals, wherein the varying includes adjusting the power and/or attenuation of the signals.

2. The communication system of claim 1, wherein the communication system comprises a repeater or a distributed antenna system used in a mobile environment.

3. The communication system of claim 2, wherein the mobile environment comprises a train, a ship, or an automotive vehicle.

4. The communication system of claim 1, wherein the processing circuitry is configured to analyze information regarding current characteristics associated with the received communication signals at a current geographical location of the communication system, the processing circuitry further configured to adapt the at least one configurable setting of the communication system.

5. The communication system of claim 1, wherein the processing circuitry is further configured to:

log data associated with the received communication signals and the transmitted processed signals in at least one temporal log file;

continue logging data for a predetermined amount of time after detecting a fault associated with the communication system; and store the data in the at least one temporal log file into at least one log file in response to the detection of a fault.

6. The communication system of claim 1, wherein a plurality of settings are configurable and the processing circuitry is further configured to adapt:

each the plurality of configurable settings of the communication system; or a first portion of the plurality of configurable settings of the communication system while leaving a second portion of the plurality of configurable settings unchanged.

7. The communication system of claim 1, wherein the processing circuitry is further configured to:

receive information regarding a location of a base station in communication with the communication system; and proactively adapt the at least one configurable setting of the communication system based upon the location of the base station.

8. The communication system of claim 1, the communication system further comprising:

an automatic gain control circuit, wherein the processing circuitry is configured to adapt the automatic gain control circuit, wherein the processing circuitry is configured to increase or decrease the gain applied to the received communication signals with the automatic gain control circuit.

9. The communication system of claim 1, wherein the processing circuitry is further configured to transmit the current location information to a computing system.

10. The communication system of claim 1, wherein the processing circuitry is further configured to receive configuration information from a computing system, the configuration information including known characteristics associated with the received communication signals or the transmitted processed signals at a potential future geographical location of the communication system.

11. The communication system of claim 10, wherein the configuration information includes data collected by the communication system, data collected from a second communication system and/or data collected from external to the communication system.

12. The communication system of claim 1, wherein the processing circuitry is further configured to determine a plurality of current operating conditions and to adapt the at least one configurable setting of the communication system based upon at least one of the plurality of current operating conditions.

13. The communication system of claim 12, wherein at least one of the plurality of current operating conditions includes:

an identification of a base station in communication with the communication system;

an identification of at least one network the communication system is in communication with; and/or an environmental detail of the communication system.

14. The communication system of claim 12, wherein at least one of the plurality of current operating conditions includes an identification of a base station in communication with the communication system selected from the group consisting of: a location of the base station, a network property associated with the base station, a signal property associated with the base station, and combinations thereof.

15. The communication system of claim 12, wherein at least one of the plurality of current operating conditions includes an environmental detail of the communication system selected from the group consisting of: a speed of a mobile platform containing the communication system, an ambient temperature, a time of day, a communication traffic condition of the communication system, an obstacle to transmission by the communication system, logistical information regarding the mobile platform containing the communication system, and combinations thereof.

* * * * *